US012724135B2

(12) United States Patent
Guo et al.

(10) Patent No.: US 12,724,135 B2
(45) Date of Patent: Sep. 1, 2026

(54) COMMUNICATION METHOD AND APPARATUS

(71) Applicant: Yinwang Intelligent Technologies Co., Ltd., Shenzhen (CN)

(72) Inventors: Shaonan Guo, CHangdu (CN); Yikai Wang, Chengdu (CN); Bailu Wang, Shenzhen (CN); Lan You, Shanghai (CN); Buxiao Cai, Changdu (CN); Jianping Li, Changdu (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 467 days.

(21) Appl. No.: 18/300,608

(22) Filed: Apr. 14, 2023

(65) Prior Publication Data

US 2023/0251367 A1 Aug. 10, 2023

Related U.S. Application Data

(63) Continuation of application No. PCT/CN2020/121557, filed on Oct. 16, 2020.

(51) Int. Cl.
*G01S 13/06* (2006.01)
*G01S 13/50* (2006.01)
(Continued)

(52) U.S. Cl.
CPC .............. *G01S 13/06* (2013.01); *G01S 13/50* (2013.01); *G06Q 20/32* (2013.01); *G06Q 50/40* (2024.01)

(58) Field of Classification Search
CPC .......... G01S 13/06; G01S 13/50; G01S 13/42; G01S 7/006; G01S 13/003; G01S 13/931; G06Q 50/40; G06Q 20/32
See application file for complete search history.

(56) References Cited

U.S. PATENT DOCUMENTS 10,185,327 B1 * 1/2019 Konrardy ........... G01C 21/3461
2020/0342430 A1 * 10/2020 Li ......................... G06F 16/245
(Continued)

FOREIGN PATENT DOCUMENTS

CN 101494523 A 7/2009
CN 102622787 A 8/2012
(Continued)

OTHER PUBLICATIONS

A_novel_architecture_for_multilane-free-flow_electronic-toll-collection_systems.pdf, A Novel Architecture for Multilane-Free-Flow Electronic-Toll-Collection Systems in the Millimeter-Wave Range, Shieh (Year: 2005).*
(Continued)

*Primary Examiner* — William Kelleher
*Assistant Examiner* — Kenneth W Good
(74) *Attorney, Agent, or Firm* — Fish & Richardson P.C.

(57) ABSTRACT

The present disclosure provides a communication method and apparatus. In an example, the communication method may include: transmitting a first radar transmit signal in a first frequency band by using a first transmit antenna array; receiving a first echo signal of the first radar transmit signal in the first frequency band by using a first receive antenna array, where the first echo signal includes an echo signal corresponding to at least one first terminal; and communicating with at least one second terminal in a second frequency band by using a second transmit antenna array and a second receive antenna array, where the first frequency band and the second frequency band do not overlap.

20 Claims, 10 Drawing Sheets

(51) Int. Cl.
*G06Q 20/32* (2012.01)
*G06Q 50/40* (2024.01)

(56) References Cited

U.S. PATENT DOCUMENTS

2021/0406893 A1* 12/2021 Calvert ................ G06Q 20/204
2022/0057502 A1* 2/2022 Oishi .................... G01S 13/765
2022/0264322 A1* 8/2022 Choi .................... H04B 7/0617
2023/0246332 A1* 8/2023 Pu ........................... G01S 7/006
342/52
2024/0012139 A1* 1/2024 Gulati .................. G01S 13/426

FOREIGN PATENT DOCUMENTS

CN 103268639 A 8/2013
CN 103514636 A 1/2014
CN 104574536 A 4/2015
CN 206819413 U 12/2017

OTHER PUBLICATIONS

Liu, "Let ETC be more free-Analysis of ETC multi-lane free flow charging related issues," China Traffic Informatization, Dec. 16, 2014, 13 pages (with English translation).
International Search Report and Written Opinion in International Appln. No. PCT/CN2020/121557, mailed on Jul. 20, 2021, 13 pages (with English translation).

* cited by examiner

200
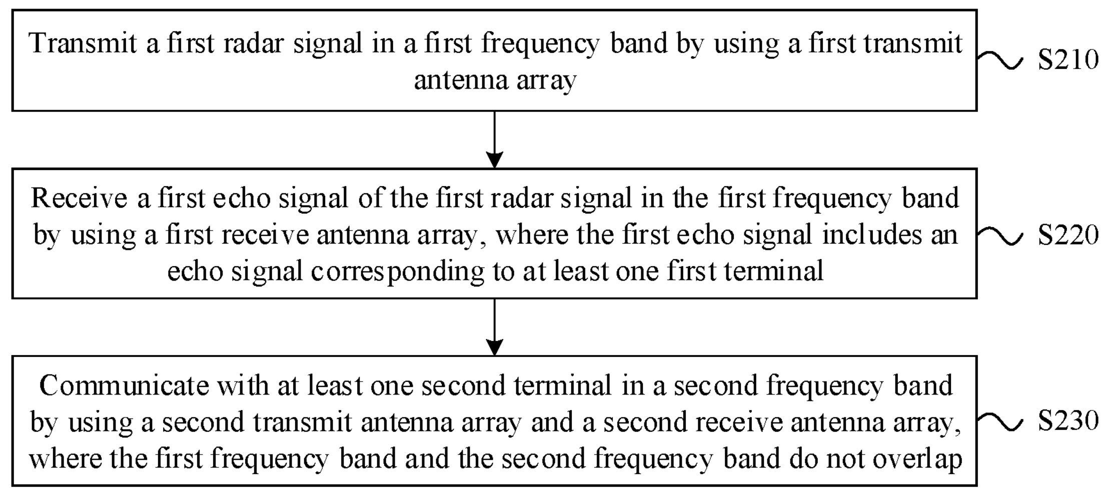
FIG. 6
Frequency band 1
Frequency band 2
Frequency band 3
Frequency band 4
Frequency band 5
5725 5787.5 5802.5 5827.5 5842.5 5850
Unit: MHz (MHz)
FIG. 7
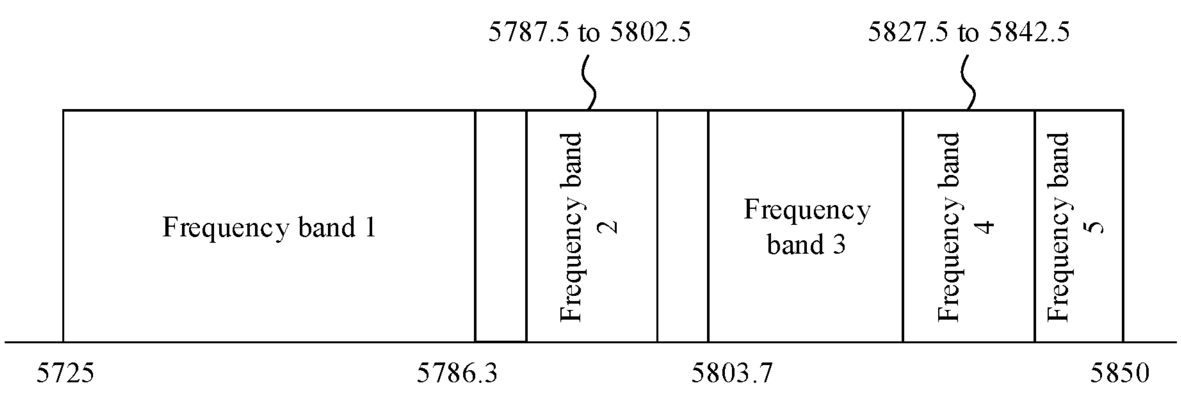
FIG. 8

Transmit antenna array $T_X1$ $T_X2$ $T_X3$ $T_X4$ $R_X1$ $R_X2$ $R_X3$ $R_X4$

Receive antenna array

COMMUNICATION METHOD AND APPARATUS

CROSS-REFERENCE TO RELATED APPLICATIONS

This application is a continuation of International Application No. PCT/CN2020/121557, filed on Oct. 16, 2020, the disclosure of which is hereby incorporated by reference in its entirety.

TECHNICAL FIELD

This application relates to the field of integrated sensing and communication technologies, and more specifically, to a communication method and apparatus in the field of integrated sensing and communication technologies, for example, a road side unit and a method for communication between a road side unit and an on board unit.

BACKGROUND

With the development of urbanization, the transportation infrastructure is improving, and the highway network that is dominated by highways has covered the whole country. However, as the traffic flow increases, vehicles often queue up at toll gates on highways and traffic congestion occurs. As a result, the communication capability of road sections deteriorates.

An electronic toll collection (electronic toll collection, ETC) system implements toll collection without stopping vehicles through dedicated link interaction between a road side unit (road side unit, RSU) and an on board unit (on board unit, OBU) based on wireless communication technologies such as dedicated short-range communication (dedicated short-range communication, DSRC), which greatly alleviates traffic congestion.

Currently, a common ETC toll collection system in the market is usually deployed in single-module single-lane mode. That is, one ETC module covers one lane. A maximum communication distance for an ETC module to successfully activate an OBU and implement toll collection is usually 15 to 20 meters. A communication distance of the ETC module is short, communication duration of the ETC module is also short in a high-speed free-flow toll collection scenario, and a vehicle in a reverse lane or an adjacent lane interferes with a current toll lane. Consequently, working efficiency and performance of an ETC transaction are poor.

SUMMARY

According to the communication method and apparatus provided in embodiments of this application, working efficiency and performance of a sensing and communication integrated communication apparatus can be improved.

According to a first aspect, an embodiment of this application provides a communication method. The method includes: transmitting a first radar transmit signal in a first frequency band by using a first transmit antenna array; receiving a first echo signal of the first radar transmit signal in the first frequency band by using a first receive antenna array, where the first echo signal includes an echo signal corresponding to at least one first terminal; and communicating with at least one second terminal in a second frequency band by using a second transmit antenna array and a second receive antenna array, where the first frequency band and the second frequency band do not overlap.

Optionally, the method may be performed by a communication apparatus, or may be performed by the communication apparatus under control of a signal processing apparatus in the communication apparatus. For clarity, only an example in which the method is performed by the communication apparatus is used below for description. However, embodiments of this application are not limited thereto.

The communication apparatus provided in embodiments of this application may be a sensing and communication integrated communication apparatus. To be specific, the communication apparatus has a communication capability, that is, can receive and transmit communication signals (including a first communication signal and/or a second communication signal described below), to implement communication with a terminal, and has a sensing capability, that is, can receive and transmit radar signals (including the first radar transmit signal and/or the first echo signal). High-precision ranging, speed measurement, angle measurement, and long-distance tracking of the terminal are implemented by using the foregoing communication method.

In a possible implementation, the second frequency band may include a first sub-frequency band and a second sub-frequency band, and the first sub-frequency band and the second sub-frequency band do not overlap. Correspondingly, that the communication apparatus communicates with the at least one second terminal in the second frequency band by using the second transmit antenna array and the second receive antenna array may include: receiving a first communication signal from the at least one second terminal in the first sub-frequency band by using the second receive antenna array; and/or transmitting a second communication signal to the at least one second terminal in the second sub-frequency band by using the second transmit antenna array.

It should be noted that, the first communication signal and the second communication signal may support a first communication protocol, that is, the first communication signal and the second communication signal may be understood as signals transmitted during communication by using the first communication protocol.

It should be noted that in this embodiment of this application, that the first communication protocol is the ETC communication protocol is only used as an example for description. However, it should be learned that the first communication protocol may be another communication protocol. This is not limited in embodiments of this application.

In a possible implementation, the communication apparatus may implement sensing and communication functions in different frequency bands. For example, the first communication signal and the second communication signal support an ETC communication protocol. The first frequency band may be another frequency band other than the first sub-frequency band and the second sub-frequency band in available frequency bands, and the first frequency band, the first sub-frequency band, and the second sub-frequency band do not overlap.

For example, a maximum bandwidth of a radar signal may be about 100 MHz, and a maximum bandwidth of the first communication signal and the second communication signal may be about 15 MHz. In other words, a bandwidth of the radar signal is wider than that of the communication signal.

It should be noted that a wider bandwidth indicates higher resolution, and higher precision of a signal, thereby indicating a stronger sensing capability. Therefore, resolution and precision of the radar signal are higher. In addition, the radar signal adopts a mechanism of signal coherent accumulation, which determines a coverage area of the radar signal is larger than that of the communication signal.

According to the communication method provided in this embodiment of this application, the communication apparatus can transmit a narrow-bandwidth communication signal, and can also transmit a high-bandwidth radar signal with higher precision and a larger coverage area.

Because hardware designs of on board unit OBU manufacturers are different, an uplink signal has a specific frequency offset. Therefore, for this frequency offset, a specific guard frequency band needs to be added to a frequency band occupied by the uplink signal (that is, the first communication signal), so that mutual interference between two different types of signals: a communication signal and a radar signal can be avoided.

Optionally, a width of the guard frequency band may be 1.2 MHz.

Optionally, the first transmit antenna array and the second transmit antenna array may be the same or different; and/or the first receive antenna array and the second receive antenna array may be the same or different. This is not limited in embodiments of this application.

In a possible implementation, the first transmit antenna array and the second transmit antenna array are different, and the first receive antenna array and the second receive antenna array are different.

In other words, the communication apparatus may include two independent transceiver antenna arrays. The communication apparatus may receive and transmit communication signals (for example, receive an uplink first communication signal and transmit a downlink second communication signal) by using one transceiver antenna array, and receive and transmit radar signals (for example, transmit a first radar signal and receive a first echo signal) by using another transceiver antenna array.

It should be noted that in embodiments of this application, downlink is a transmission direction from the communication apparatus to the terminal, and uplink is a transmission direction from the terminal to the communication apparatus.

In another possible implementation, the first transmit antenna array and the second transmit antenna array are the same, and the first receive antenna array and the second receive antenna array are different.

In other words, the communication apparatus may include one transmit antenna array and two receive antenna arrays. The communication apparatus may transmit a radar signal (for example, a first radar signal) and a downlink communication signal (for example, a second communication signal) by multiplexing the transmit antenna array in a frequency division manner, and respectively receive an echo signal (for example, a first echo signal) and an uplink communication signal (for example, a first communication signal) by using the two receive antenna arrays.

In still another possible implementation, the first transmit antenna array and the second transmit antenna array are different, and the first receive antenna array and the second receive antenna array are the same.

In other words, the communication apparatus may include one receive antenna array and two transmit antenna arrays. The communication apparatus may receive an echo signal (for example, a first echo signal) and an uplink communication signal (for example, a first communication signal) by multiplexing the receive antenna array in a frequency division manner, and respectively transmit a radar signal (for example, a first radar signal) and a downlink communication signal (for example, a second communication signal) by using the two transmit antenna arrays.

In still another possible implementation, the first transmit antenna array and the second transmit antenna array are the same, and the first receive antenna and the second receive antenna array are the same.

That is, the communication apparatus may include only one transceiver antenna array, and the communication apparatus may receive and transmit a communication signal and a radar signal by multiplexing the transceiver antenna array in a frequency division manner.

According to the communication method provided in this embodiment of this application, the communication apparatus implements radar signal receiving and transmitting (for example, transmitting a first radar signal and receiving a first echo signal) and communication signal receiving and transmitting (for example, receiving an uplink first communication signal and transmitting a downlink second communication signal) by multiplexing one transceiver antenna array in a frequency division manner, so that costs and overheads of the communication apparatus can be reduced.

Optionally, that the communication apparatus includes one transmit antenna array and one receive antenna array, the transmit antenna array includes a plurality of transmit antennas, and the receive antenna array includes a plurality of receive antennas is used as an example. That the communication apparatus communicates with the at least one second terminal in the second frequency band by using the second transmit antenna array and the second receive antenna array may include: receiving a first communication signal from the at least one second terminal in the first sub-frequency band by using the plurality of receive antennas; and/or transmitting a second communication signal to the at least one second terminal in the second sub-frequency band by using the plurality of transmit antennas.

Correspondingly, that the communication apparatus transmits the first radar transmit signal in the first frequency band by using the first transmit antenna array may include: transmitting the first radar signal by multiplexing at least two transmit antennas of the plurality of transmit antennas; and/or that the communication apparatus receives the first echo signal of the first radar transmit signal in the first frequency band by using the first receive antenna array may include: receiving the first echo signal by multiplexing at least two receive antennas of the plurality of receive antennas.

Optionally, the at least one first terminal may include the at least one second terminal. In another possible implementation, the at least one first terminal and the at least one second terminal may be different.

In a possible implementation, when the at least one first terminal may include the at least one second terminal, the at least one second terminal may be determined from the at least one first terminal. Specifically, before the communication apparatus communicates with the at least one second terminal in the second frequency band by using the second transmit antenna array and the second receive antenna array, the communication apparatus may determine the at least one second terminal from the at least one first terminal.

Optionally, the at least one second terminal includes one or more first terminals whose first distance from the first receive antenna array is less than or equal to a first distance threshold and/or whose speed direction is a first direction in the at least one first terminal.

It should be noted that various distances in this application, for example, a distance between the terminal and the first transmit antenna array, a distance between the terminal and the second transmit antenna array, a distance between the terminal and the first receive antenna array, a distance between the terminal and the second receive antenna array, or a distance between the terminal and the communication apparatus, may be mutually converted in some cases. For example, in the communication apparatus, distances of the transmit antenna array, distances of the receive antenna array, or distances between the transmit antenna array and receive antenna array are preset. In this way, other distances may be deduced, calculated, or determined based on one distance, that is, there is a specific conversion relationship between these distances. Therefore, the communication apparatus may obtain another distance based on one of the distances and a relative location relationship between the antenna arrays. In this embodiment of this application, only one distance is used as an example for description. However, this embodiment of this application is not limited thereto.

It should be noted that the first distance threshold may represent a maximum communication distance of a communication signal. That is, when the first distance of the first terminal is less than or equal to the first distance threshold, the first terminal is within the maximum communication distance of the communication signal, that is, the first terminal can communicate with the communication apparatus.

Optionally, because the coverage area of the radar signal is greater than the coverage area of the communication signal, the first distance threshold may be less than a second distance threshold, and the second distance threshold may represent a maximum detection distance of the radar signal. That is, when the first distance of the first terminal is greater than the first distance threshold but less than the second distance threshold, the first terminal may be detected by using a radar signal, but cannot communicate with the communication apparatus.

Optionally, the first distance threshold and/or the second distance threshold may be parameters preconfigured for the communication apparatus.

It should be noted that, the coverage area of the communication signal is a sphere that uses the communication apparatus (or the second transmit antenna array or the second receive antenna array) as a circle center and uses a maximum communication distance (for example, the first distance threshold) of the communication signal as a radius; and/or the coverage area of the radar signal is a sphere that uses the communication apparatus (or the first transmit antenna array or the first receive antenna array) as a circle center and uses a maximum detection distance (for example, the second distance threshold) of the radar signal as a radius.

Optionally, the communication apparatus may determine the at least one second terminal from the at least one first terminal in a plurality of manners. This is not limited in embodiments of this application.

For example, in a possible implementation, the communication apparatus may transmit an activation signal (that is, a communication signal) through broadcasting; receive an answer signal corresponding to the activation signal; and determine at least one first terminal corresponding to the received answer signal as the at least one second terminal. In other words, the at least one second terminal may include one or more first terminals that are in the at least one first terminal and that are successfully activated by the activation signal of the communication apparatus and that transmit an answer signal corresponding to the activation signal to the communication apparatus.

According to the communication method provided in this embodiment of this application, the communication apparatus determines, by broadcasting the activation signal, the at least one activated second terminal, and only needs to simply receive and transmit a signal, without processing the signal, so that processing complexity of the communication apparatus can be reduced.

For another example, in another possible implementation, the communication apparatus may determine the at least one second terminal from the at least one first terminal based on the first echo signal. In other words, the at least one second terminal is determined from the at least one first terminal based on the first echo signal.

Optionally, the communication apparatus may determine, based on the first echo signal, a first distance and/or a speed direction between a first terminal in the at least one first terminal and the first receive antenna array; and determine the at least one second terminal from the at least one first terminal based on the first distance and/or the speed direction between the first terminal in the at least one first terminal and the first receive antenna array.

Further, the first distance between the first terminal in the at least one first terminal and the first receive antenna array may be indicated by using first distance information; and/or the speed direction of the first terminal in the at least one first terminal may be indicated by using speed information.

Alternatively, the communication apparatus may determine the first distance information and/or the speed information based on the first echo signal, and determine the at least one second terminal from the at least one first terminal based on the first distance information and/or the speed information.

It should be further noted that the speed direction in this embodiment of this application mainly includes a traveling direction towards the communication apparatus (that is, the first direction) or a traveling direction away from the communication apparatus.

According to the communication method provided in this embodiment of this application, because a radar signal has a large coverage area, high resolution, and a strong perception capability, precision of the first distance information and/or the speed information of the at least one first terminal that is detected based on the radar signal is high. Further, the communication apparatus can communicate with the at least one second terminal more accurately, thereby improving a communication success rate and communication efficiency.

In a possible implementation, that the communication apparatus communicates with the at least one second terminal in the second frequency band by using the second transmit antenna array and the second receive antenna array may include: receiving a first communication signal from the at least one second terminal in the first sub-frequency band by using the second receive antenna array; and transmitting a second communication signal to the at least one second terminal in the second sub-frequency band by using the second transmit antenna array.

Optionally, the communication apparatus may transmit the second communication signal to the at least one second terminal in the second sub-frequency band by using the second transmit antenna array in a plurality of manners. This is not limited in embodiments of this application.

The following describes, by using Manner 1 to Manner 3 as an example, a process in which the communication apparatus transmits the second communication signal to the at least one second terminal by using the second transmit antenna array. However, this embodiment of this application is not limited thereto.

Manner 1: The communication apparatus may transmit the second communication signal to the at least one second terminal in the second frequency band based on the first communication signal by using the second transmit antenna array.

Specifically, the second communication signal is transmitted after beamforming is performed, by using first angle information, on a signal transmitted by the second transmit antenna array, where the first angle information is obtained based on a first communication signal from the at least one second terminal, and the first angle information is used to indicate at least one of a horizontal angle or a pitch angle of the at least one second terminal relative to the second transmit antenna array.

In other words, the communication apparatus may obtain the first angle information based on the first communication signal from the at least one second terminal, perform, based on the first angle information, beamforming on a downlink communication signal transmitted by the second transmit antenna array, and transmit, to each second terminal of the at least one second terminal, a beamformed second communication signal corresponding to each second terminal.

It should be noted that the communication apparatus performs a separate operation on the first communication signal of each second terminal, to obtain an angle (including a horizontal angle and/or a pitch angle) of each second terminal relative to the second transmit antenna array. Similarly, the communication apparatus performs, based on the angle of each second terminal relative to the second transmit antenna array, beamforming on a signal transmitted by the second transmit antenna array, and separately transmits, to each second terminal, a beamformed second communication signal corresponding to each second terminal.

Optionally, beamforming in this embodiment of this application may be digital beamforming or analog beamforming. This is not limited in embodiments of this application. For example, beamforming may be digital beamforming.

It should be noted that various angles (including a horizontal angle and/or a pitch angle) in this embodiment of this application, for example, an angle of the terminal relative to the first transmit antenna array, an angle of the terminal relative to the second transmit antenna array, an angle of the terminal relative to the first receive antenna array, an angle of the terminal relative to the second receive antenna array, or an angle of the terminal relative to the communication apparatus, may be mutually converted in some cases. For example, in the communication apparatus, an angle relationship of each transmit antenna array, an angle relationship of each receive antenna array, or an angle relationship between each transmit antenna array and each receive antenna array is preset. In this way, another angle may be deduced, calculated, or determined based on one angle, that is, there is a conversion relationship between these angles. Therefore, the communication apparatus may obtain another angle based on one of the angles and a relative angle relationship between the antenna arrays. In this embodiment of this application, only one angle is used as an example for description. However, this embodiment of this application is not limited thereto.

That is, the first angle information may include a horizontal angle and/or a pitch angle of the at least one second terminal relative to the second transmit antenna array; or the first angle information may include a horizontal angle and/or a pitch angle of the at least one second terminal relative to the second receive antenna array; or the first angle information may include a horizontal angle and/or a pitch angle of the at least one second terminal relative to the communication apparatus.

According to the communication method provided in this embodiment of this application, the communication apparatus may accurately guide beamforming of a downlink communication signal as much as possible by using a sensing capability of an uplink first communication signal, thereby improving work efficiency and performance of the sensing and communication integrated communication apparatus.

Manner 2: The communication apparatus may transmit the second communication signal to at least one third terminal in the second frequency band based on the first communication signal and the second echo signal by using the second transmit antenna array, where the at least one second terminal includes the at least one third terminal, and the second echo signal includes an echo signal corresponding to the at least one second terminal.

Optionally, the communication apparatus may obtain the second echo signal in a plurality of manners. This is not limited in embodiments of this application.

In a first possible implementation, the communication apparatus may obtain the second echo signal from the first echo signal. In other words, the first echo signal includes the second echo signal.

In a second possible implementation, the communication apparatus may transmit a second radar signal in the first frequency band by using the first transmit antenna array; and receive the second echo signal of the second radar signal in the first frequency band by using the first receive antenna array.

Optionally, the second radar signal may be a radar signal transmitted by the communication apparatus after the first radar signal.

Specifically, the second communication signal is transmitted after beamforming is performed, by using second angle information and third angle information, on the signal transmitted by the second transmit antenna array. The second angle information is used to indicate a pitch angle of the at least one third terminal relative to the second transmit antenna array, the third angle information is used to indicate a horizontal angle of the at least one third terminal relative to the first transmit antenna array, the second angle information is obtained based on the first communication signal from the at least one third terminal, and the third angle information is obtained based on the second echo signal.

That is, the communication apparatus may obtain the second angle information and the third angle information based on the first communication signal from the at least one third terminal and the second echo signal; and perform, based on the second angle information and the third angle information, beamforming on the downlink communication signal transmitted by the second transmit antenna array, and transmit, to each third terminal of the at least one third terminal, a beamformed second communication signal corresponding to each third terminal.

It should be noted that for details of the second angle information and the third angle information, refer to the description of the first angle information in Manner 1. Details are not described in this embodiment of this application again.

According to the communication method provided in this embodiment of this application, because resolution of a horizontal angle of a radar signal is higher, replacing the uplink first communication signal with the second radar signal to sense the horizontal angle of the at least one third terminal can further optimize beamforming precision of the downlink communication signal, thereby improving work efficiency and performance of the sensing and communication integrated communication apparatus.

In addition, the second echo signal obtained by the communication apparatus based on the second radar signal transmitted after the first radar signal (that is, based on the second echo signal obtained in the foregoing second manner) has better real-time performance, and can be used to obtain third angle information with high precision, which can be used to further optimize beamforming precision of a downlink communication signal, thereby improving work efficiency and performance of the sensing and communication integrated communication apparatus.

Optionally, the at least one third terminal is determined from the at least one second terminal. In other words, before the communication apparatus transmits the second communication signal to the at least one third terminal by using the second transmit antenna array, the communication apparatus may determine the at least one third terminal from the at least one second terminal.

Specifically, the at least one third terminal may include one or more second terminals whose distance difference is less than or equal to a third distance threshold in the at least one second terminal, where the distance difference of the second terminal indicates a difference between a second distance between the second terminal and the first receive antenna array and a third distance between the second terminal and the second receive antenna array, where the second distance between the at least one second terminal and the first receive antenna array is obtained based on the second echo signal, and the third distance between the at least one second terminal and the second receive antenna array is determined based on the first communication signal of the at least one second terminal.

Optionally, the second distance is indicated by using second distance information, and the third distance is indicated by using third distance information. In other words, the communication apparatus may determine the second distance information based on the second echo signal; determine the second distance between the at least one second terminal and the first receive antenna array based on the second distance information; determine the third distance information of the at least one second terminal based on the first communication signal from the at least one second terminal; determine the third distance between the at least one second terminal and the second receive antenna array based on the third distance information; and determine the second distance between the at least one second terminal and the first receive antenna array and the third distance between the at least one second terminal and the second receive antenna array based on the second distance information, and determine the at least one third terminal from the at least one second terminal.

It should be noted that, for details of the second distance, refer to the foregoing description of the first distance. Details are not described herein in this embodiment of this application again.

It should be noted that the third distance threshold may be understood as an error threshold between the second distance determined based on the radar signal and the third distance determined based on the communication signal. That is, when the difference is less than or equal to the third distance threshold, the communication apparatus may determine that the distances of the second terminals that are determined based on the second echo signal and the first communication signal are approximately consistent. Alternatively, when the difference is greater than the third distance threshold, the communication apparatus may determine that the distances of the second terminal determined by using the second echo signal and the first communication signal are inconsistent.

Optionally, the third distance threshold may be a parameter preconfigured for the communication apparatus.

According to the communication method provided in this embodiment of this application, the communication apparatus excludes, from the at least one second terminal, a second terminal whose distance determined based on a radar signal and a communication signal is inconsistent, so as to avoid a case in which a second communication signal corresponding to the second terminal cannot be accurately transmitted to the second terminal due to incorrect distance determining of the second terminal, thereby improving beamforming precision of a downlink communication signal, and improving work efficiency and performance of the sensing and communication integrated communication apparatus.

Manner 3: The communication apparatus may transmit the second communication signal to the at least one second terminal in the second frequency band based on the second echo signal by using the second transmit antenna array, where the second echo signal includes an echo signal corresponding to the at least one second terminal.

Optionally, for a specific manner of obtaining the second echo signal by the communication apparatus, refer to the description in Manner 2. Details are not described herein again in this embodiment of this application again.

Specifically, the second communication signal is transmitted after beamforming is performed, by using fourth angle information, on a signal transmitted by the second transmit antenna array, where the fourth angle information is obtained based on the second echo signal, and the fourth angle information is used to indicate at least one of a horizontal angle or a pitch angle of the at least one second terminal relative to the second transmit antenna array.

In other words, the communication apparatus may obtain the fourth angle information based on the second echo signal, perform, based on the fourth angle information, beamforming on the downlink communication signal transmitted by the second transmit antenna array, and transmit, to each second terminal of the at least one second terminal, a beamformed second communication signal corresponding to each second terminal.

Optionally, the second echo signal and the first echo signal may be the same as different. For details, refer to the description of the second echo signal in Manner 2. This is not limited in embodiments of this application.

In addition, when the at least one second terminal includes at least two second terminals that belong to different lanes, the communication apparatus can communicate with second terminals on a plurality of lanes as accurately as possible by using any one of the foregoing manners 1 to 3. In other words, only one sensing and communication integrated communication apparatus provided in this embodiment of this application needs to be installed on the plurality of lanes, so that multi-lane coverage and multi-lane vehicle sensing can be implemented, thereby reducing costs and maintenance amounts.

Optionally, the method may further include: The communication apparatus inspects, based on the first echo signal and the first communication signal, a vehicle violating traffic rules in the at least one second terminal.

Specifically, the vehicle violating traffic rules include a second terminal that is in the at least one second terminal and whose first vehicle model fails to match a second vehicle model, the first vehicle model represents a real vehicle model of the second terminal, and the second vehicle model represents a vehicle model reported by the second terminal.

In a possible implementation, the first vehicle model may be indicated by using first vehicle model information, the second vehicle model may be indicated by using second vehicle model information, the first vehicle model information is obtained based on a first echo signal, and the second vehicle model information is indicated by using a first communication signal from the second terminal.

In other words, the communication apparatus may determine the first vehicle model information of the second terminal based on the first echo signal, where the first vehicle model information is used to indicate the first vehicle model of the second terminal; obtain the second vehicle model information indicated by the first communication signal from the second terminal, where the second vehicle model information is used to indicate the second vehicle model of the second terminal; and match the first vehicle model with the second vehicle model; and if the matching fails, a vehicle in which the second terminal is located is a vehicle violating traffic rules.

Optionally, vehicle types (including the first vehicle type and/or the second vehicle type) in this embodiment of this application may include a large vehicle, a medium vehicle, or a small vehicle.

According to the communication method provided in this embodiment of this application, the communication apparatus may assist a traffic management department in inspecting a vehicle violating traffic rules by using an uplink first communication signal and a first echo signal.

Optionally, when the communication apparatus inspects that the vehicle in which a at least one second target terminal is located is a vehicle violating traffic rules, the communication apparatus may give an alarm, prompt, and/or further track the at least one second target terminal. The at least one second terminal includes the at least one second target terminal. This is not limited in embodiments of this application.

In a possible implementation, the communication apparatus may determine location information of the at least one second target terminal based on a first communication signal from the at least one second target terminal, and transmit the location information of the at least one second target terminal to a camera apparatus, where the location information of the at least one second target terminal is used to position the at least one second target terminal.

Specifically, the communication apparatus may determine first angle information of the at least one second target terminal based on the first communication signal from the at least one second target terminal, where the first angle information is used to indicate a horizontal angle and/or a pitch angle between the second target terminal and the second transmit antenna array; and determine the location information of the at least one second target terminal based on the first angle information of the at least one second target terminal.

Correspondingly, the camera apparatus may capture an image of the at least one second target terminal in real time based on the location information of the at least one second target terminal, and perform tracking processing on the at least one second target terminal based on the image of the at least one second target terminal.

According to the communication method provided in this embodiment of this application, the communication apparatus may position the second target terminal in real time based on a first communication signal from the second target terminal on the vehicle violating traffic rules, and assist the camera apparatus in further tracking based on the positioning.

According to a second aspect, an embodiment of this application further provides a communication apparatus, configured to perform the method according to any one of the first aspect or the possible implementations of the first aspect. Specifically, the communication apparatus may include one or more function units configured to perform the method in any one of the first aspect or the possible implementations of the first aspect.

According to a third aspect, an embodiment of this application further provides a signal processing apparatus, including at least one communication interface and at least one processor. The at least one communication interface is configured to communicate with a second transmit antenna array and a second receive antenna array. When executing program code or instructions, the at least one processor implements the method according to the first aspect or any possible implementation of the first aspect.

In a possible implementation, the second transmit antenna array may include a plurality of transmit antennas, and the second receive antenna array may include a plurality of receive antennas. When executing program code or instructions, the at least one processor controls, b using the at least one communication interface, the plurality of transmit antennas and the plurality of receive antennas to receive and transmit communication signals, and/or controls one or more of the plurality of transmit antennas and one or more of the plurality of receive antennas to receive and transmit radar signals. Further, the communication signal and the radar signal occupy different frequency bands.

According to a fourth aspect, an embodiment of this application further provides a signal processing apparatus, including at least one communication interface and at least one processor. The at least one communication interface is configured to communicate with a second transmit antenna array, a second receive antenna array, as well as a first transmit antenna array and/or a first receive antenna array. When executing program code or instructions, the at least one processor implements the method according to the first aspect or any possible implementation of the first aspect.

Optionally, the signal processing apparatus may further include at least one memory, and the at least one memory is configured to store the program code or the instructions.

In a possible implementation, when the at least one processor executes program code or the instructions, the at least one communication interface is used to control the second transmit antenna array and the second receive antenna array to receive and transmit communication signals, and control the first transmit antenna array and the first receive antenna array to receive and transmit radar signals. Further, the communication signal and the radar signal occupy different frequency bands.

In another possible implementation, when the at least one processor executes the program code or the instructions, the at least one communication interface is used to control the second transmit antenna array and the second receive antenna array to receive and transmit communication signals, and control the first transmit antenna array and the second receive antenna array to receive and transmit radar signals. Further, the communication signal and the radar signal occupy different frequency bands.

In still another possible implementation, when the at least one processor executes the program code or the instructions, the at least one communication interface is used to control the second transmit antenna array and the second receive antenna array to receive and transmit communication signals, and control the second transmit antenna array and the first receive antenna array to receive and transmit radar signals. Further, the communication signal and the radar signal occupy different frequency bands.

According to a fifth aspect, an embodiment of this application further provides a communication apparatus, including the signal processing apparatus provided in the third aspect or the fourth aspect, a second transmit antenna array, and a second receive antenna array.

Further, optionally, the communication apparatus may further include a first transmit antenna array and/or a first receive antenna array.

The signal processing apparatus in the third aspect or the fourth aspect may be a chip apparatus or an integrated circuit in the communication apparatus in the fifth aspect.

Optionally, the communication apparatus provided in the fifth aspect may be an RSU.

According to a sixth aspect, an embodiment of this application further provides a communication system. The communication system includes the communication apparatus provided in the fifth aspect and at least one terminal.

According to a seventh aspect, this application further provides a computer-readable storage medium, configured to store a computer program. The computer program includes instructions used to implement the method according to any one of the first aspect or the possible implementations of the first aspect.

According to an eighth aspect, an embodiment of this application further provides a computer program product including instructions. When the computer program product runs on a computer, the computer is enabled to implement the method according to any one of the first aspect or the possible implementations of the first aspect.

The signal processing apparatus, the communication apparatus, the computer storage medium, the computer program product, and the communication system provided in embodiments of this application each are configured to perform the communication method provided above. Therefore, for beneficial effects that can be achieved by the signal processing apparatus, the communication apparatus, the computer storage medium, the computer program product, and the communication system, refer to beneficial effects in the communication method provided above. Details are not described herein again.

BRIEF DESCRIPTION OF DRAWINGS

FIG. 6 is a schematic flowchart of a communication method 200 according to an embodiment of this application;

FIG. 7 is a schematic diagram of signal frequency band distribution according to an embodiment of this application;

FIG. 8 is another schematic diagram of signal frequency band distribution according to an embodiment of this application;

DESCRIPTION OF EMBODIMENTS

The following describes technical solutions of this application with reference to accompanying drawings.

First, some terms in embodiments of this application are described.

1. Electronic Toll Collection (Electronic Toll Collection, ETC) System, Road Side Unit (Road Side Unit, RSU), and on Board Unit (on Board Unit, OBU)

The ETC system includes at least one of an RSU installed on an ETC-dedicated lane of a toll station and an OBU installed on a vehicle. The RSU performs dedicated link interaction with the OBU by using wireless communication technologies such as dedicated short-range communication (dedicated short-range communication, DSRC). Further, a computer network technology is used to perform background settlement processing with a bank, so that a vehicle can pay a road/bridge toll without stopping at a road/bridge toll station. This greatly alleviates traffic congestion.

2. Direction of Arrival (Direction of Arrival, DOA)

The DOA refers to a direction of arrival of a spatial signal, that is, a direction angle at which each signal arrives at an antenna in a receive antenna array. The DOA may include a horizontal angle in a horizontal direction and/or a pitch angle in a vertical direction. In some cases, the DOA has a similar function as an angle of arrival (angle of arrival, AOA).

3. Beamforming (Beamforming, BF)

Beamforming is a signal preprocessing technology based on an antenna array. A weighting coefficient of each antenna in an antenna array is adjusted by using a DOA, to generate at least one directional beam, so that an obvious array gain can be obtained.

For example, a direction of arrival (direction of arrival, DOA) may be estimated by using an uplink signal received by a receive antenna, and a beamforming vector is calculated by using the DOA. The beamforming vector is used to indicate a weighting coefficient of each antenna in a transmit antenna array. Beamforming may be performed, based on the beamforming vector, on a downlink signal transmitted by the transmit antenna array.

Optionally, beamforming in this embodiment of this application may be digital beamforming (digital beamforming, DBF) or analog beamforming. This is not limited in embodiments of this application. For example, beamforming may be DBF.

4. Virtual Aperture Technology for Multiple-Input Multiple-Output (Multiple-Input Multiple-Output, MIMO) Radar The MIMO radar is radar with a plurality of transmit antennas and a plurality of receive antennas. The MIMO radar is an effective method to improve angle resolution. Generally, angle resolution of radar is related to an aperture of a receive antenna array. Larger aperture indicates higher resolution. For the virtual aperture technology of MIMO radar, refer to the description of the conventional technology.

Figure 1:
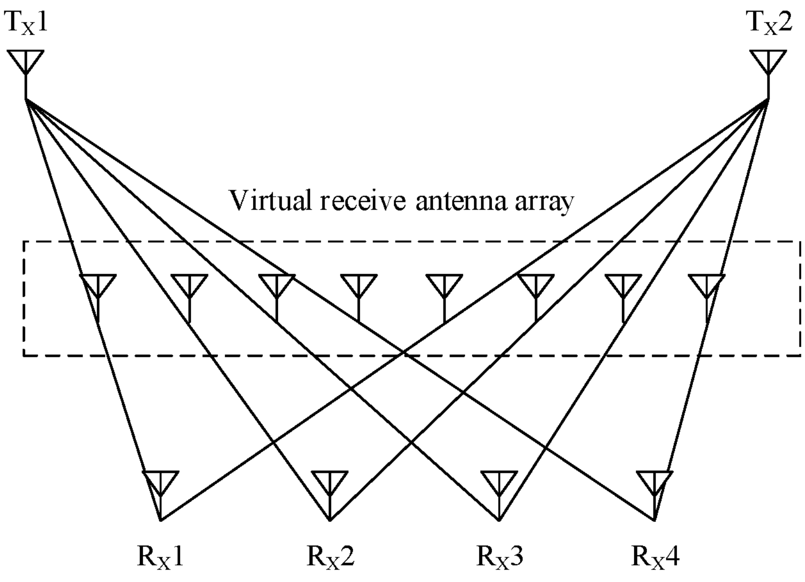
FIG. 1 is a schematic diagram of virtual array elements of MIMO radar according to an embodiment of this application.

As shown in FIG. 1, in two Tx antennas and four Rx antennas (that is, two transmit antennas and four receive antennas) MIMO radar, Tx1 may form four virtual array elements with Rx1 to Rx4, and Tx2 may form four virtual receive antennas with Rx1 to Rx4. In this way, the two Tx antennas and four Rx antennas MIMO radar may be equivalent to a virtual receive antenna array having eight virtual receive antennas.

Therefore, the two Tx antennas and four Rx antennas MIMO radar may be equivalent to one Tx antenna and eight Rx antennas single-input multiple-output (single-input multiple-output, SIMO) radar, and an aperture of a receive antenna array is extended from four physical Rx antennas to eight virtual Rx antennas, so that angle resolution can be improved.

For example, if angle resolution of MIMO radar using one Tx antenna and four Rx antennas is 30°, angle resolution of MIMO radar using two Tx antennas and four Rx antennas (equivalent to one Tx antenna and eight Rx antennas) is about 15°.

It should be noted that, because the two Tx antennas included in the MIMO radar shown in FIG. 1 are arranged in one row and two columns, the four Rx antennas are arranged in one row and four columns, and both the two Tx antennas and the four Rx antennas are arranged in a horizontal direction, an aperture of the receive antenna array is extended in the horizontal direction. This improves horizontal angle resolution. However, this embodiment of this application is not limited thereto. Similarly, the two Tx antennas and four Rx antennas may alternatively be arranged in a vertical direction. Based on a principle similar to that in FIG. 1, the aperture of the receive antenna array may be extended in the vertical direction, to improve pitch angle resolution.

It should be further noted that two Tx antennas and four Rx antennas in FIG. 1 are only examples, and this embodiment of this application is not limited thereto. Optionally, the MIMO radar may include NTx antennas and MRx antennas, where both M and N are integers greater than 1.

Further, both the NTx and the MRx of the MIMO radar may be arranged in a horizontal direction and a vertical direction respectively. In this way, the aperture of the receive antenna array may be extended in both the horizontal direction and the vertical direction, to improve the horizontal angle resolution and the pitch angle resolution.

Figure 2:
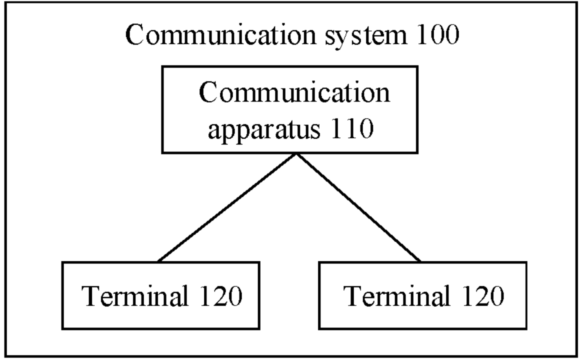
FIG. 2 is a schematic block diagram of a communication system 100 according to an embodiment of this application.

FIG. 2 is a schematic block diagram of a communication system 100 according to an embodiment of this application. The communication system 100 includes a communication apparatus 110 and at least one terminal 120. The communication apparatus 110 can communicate with the at least one terminal 120.

In a possible implementation, the communication apparatus 110 may communicate with the terminal 120 in a wireless manner.

It should be noted that the wireless manner may be implementing communication through a communication network. The communication network may be a local area network, or may be a wide area network transferred by using a relay device, or may include a local area network and a wide area network. When the communication network is a local area network, for example, the communication network may be a Wi-Fi hotspot network, a Wi-Fi P2P network, a Bluetooth network, a ZigBee network, a near field communication (near field communication, NFC) network, a possible future universal short-range communication network, a dedicated short-range communication (dedicated short-range communication, DSRC) network, or the like. When the communication network is a wide area network, the communication network may be, for example, a third-generation mobile communication technology (3rd-generation wireless telephone technology, 3G) network, a fourth generation mobile communication technology (the 4th generation mobile communication technology, 4G) network, a fifth-generation mobile communication technology (5th-generation mobile communication technology, 5G) network, a PLMN, or the Internet. This is not limited in embodiments of this application.

Optionally, the communication apparatus 110 may be of a plurality of forms. This is not limited in embodiments of this application.

In a possible implementation, the communication apparatus may be an independent device.

In another possible implementation, the communication apparatus may be integrated into another device as a function module.

Figure 3:
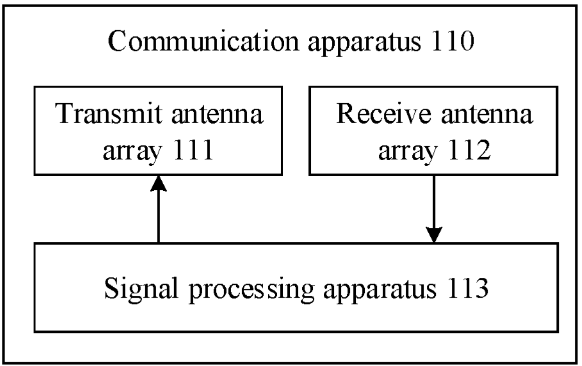
FIG. 3 is a schematic block diagram of a communication apparatus 110 according to an embodiment of this application.

FIG. 3 is a schematic block diagram of a communication apparatus 110 according to an embodiment of this application. As shown in FIG. 3, the communication apparatus 110 may include at least one transmit antenna array 111, at least one receive antenna array 112, and a signal processing apparatus 113. The at least one transmit antenna array 111, the at least one receive antenna array 112, and the signal processing apparatus 113 are connected through a communication interface. The signal processing apparatus 113 may communicate with another device by using the at least one transmit antenna array 111 and the at least one receive antenna array 112. The transmit antenna array 111 may include a plurality of transmit antennas, and the receive antenna array 112 may include a plurality of receive antennas.

In a possible implementation, the plurality of transmit antennas may be arranged in M rows and N columns, and the plurality of receive antennas may be arranged in P rows and Q columns, where M, N, P, and Q are all integers greater than 0, M and N are not 1 at the same time, and P and Q are not 1 at the same time.

Optionally, the terminal 120 may be of a plurality of forms. This is not limited in embodiments of this application.

In a possible implementation, the terminal may be an independent device.

Optionally, the terminal may be a mobile phone (mobile phone), a tablet computer (pad), a computer with a wireless transceiver function, a virtual reality (virtual reality, VR) terminal, an augmented reality (augmented reality, AR) terminal, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in smart home (smart home), or the like.

For example, the terminal may be a vehicle.

For another example, the terminal may be a smart home device, an intelligent wearable device, an uncrewed aerial vehicle, an unmanned transport vehicle, or a robot.

In another possible implementation, the terminal may be integrated into another device.

For example, the terminal may be a device that is integrated or installed in a transportation tool and that is a part of the transportation tool, for example, an OBU.

Optionally, the transportation tool in this embodiment of this application may include a vehicle, for example, a vehicle that can implement an autonomous driving, intelligent driving, or unmanned driving function.

Optionally, the communication system 100 may be applied to a plurality of application scenarios. This is not limited in embodiments of this application.

In a possible implementation, the communication system 100 may be applied to an ETC toll collection application scenario. In this application scenario, the communication apparatus 110 in FIG. 2 may be an RSU, and the terminal 120 may be an OBU on a vehicle or the vehicle.

Figure 4:
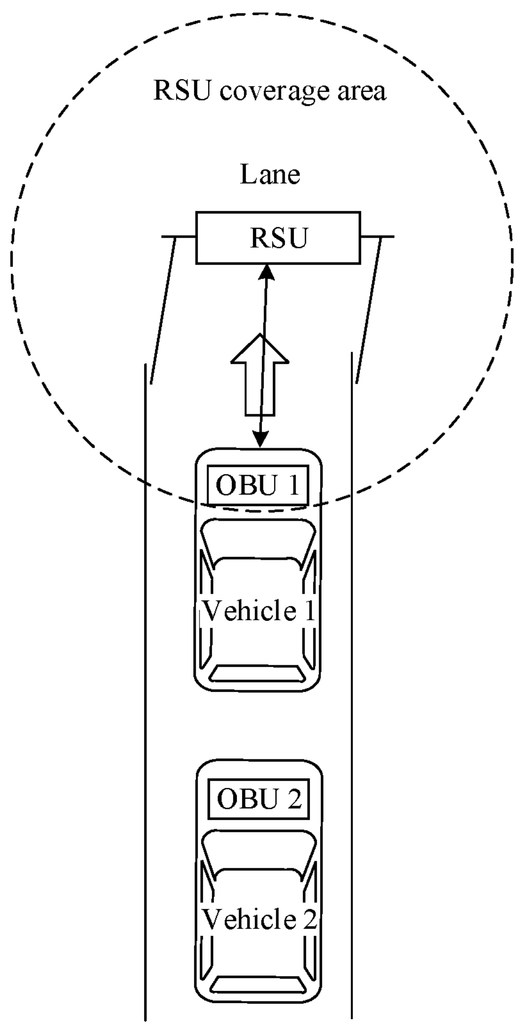
FIG. 4 is a schematic diagram of an ETC toll collection scenario according to an embodiment of this application.

FIG. 4 is a schematic diagram of a current ETC toll collection scenario. As shown in FIG. 4, one RSU is deployed on one lane. The RSU transmits an activation signal, and detects an answer signal of the OBU for the activation signal. After a vehicle 1 in which an OBU 1 is located enters a coverage area of the RSU, the OBU 1 receives an activation signal transmitted by the RSU, and returns an answer signal to the RSU based on the activation signal. Correspondingly, after the RSU detects the answer signal from the OBU 1, the RSU determines, based on the answer signal, whether a location of the OBU 1 is on the current lane, and after determining that the OBU 1 is on the current lane, the RSU performs an ETC transaction with the OBU 1.

In the foregoing scenario, there are the following problems.

(1) The RSU can cover only a single lane, and a quantity of RSUs is in direct proportion to a quantity of lanes. Consequently, in a multi-lane scenario, costs are high and a maintenance workload is large.

(2) The RSU supports only azimuth and pitch angle measurement of a single lane, RSU positioning uses a common beamforming technology, and positioning accuracy depends on a size of an antenna array. Consequently, a positioning capability is weak.

(3) The RSU needs to continuously transmit an activation signal to a lane on which the RSU is located, and waits for an answer signal of an OBU that enters the coverage area. Consequently, working efficiency is low.

(4) Bandwidth of a frequency band occupied by an ETC protocol signal is narrow, and resolution is low, that is, a sensing capability is weak. Consequently, vehicle model recognition cannot be implemented.

Figure 5:
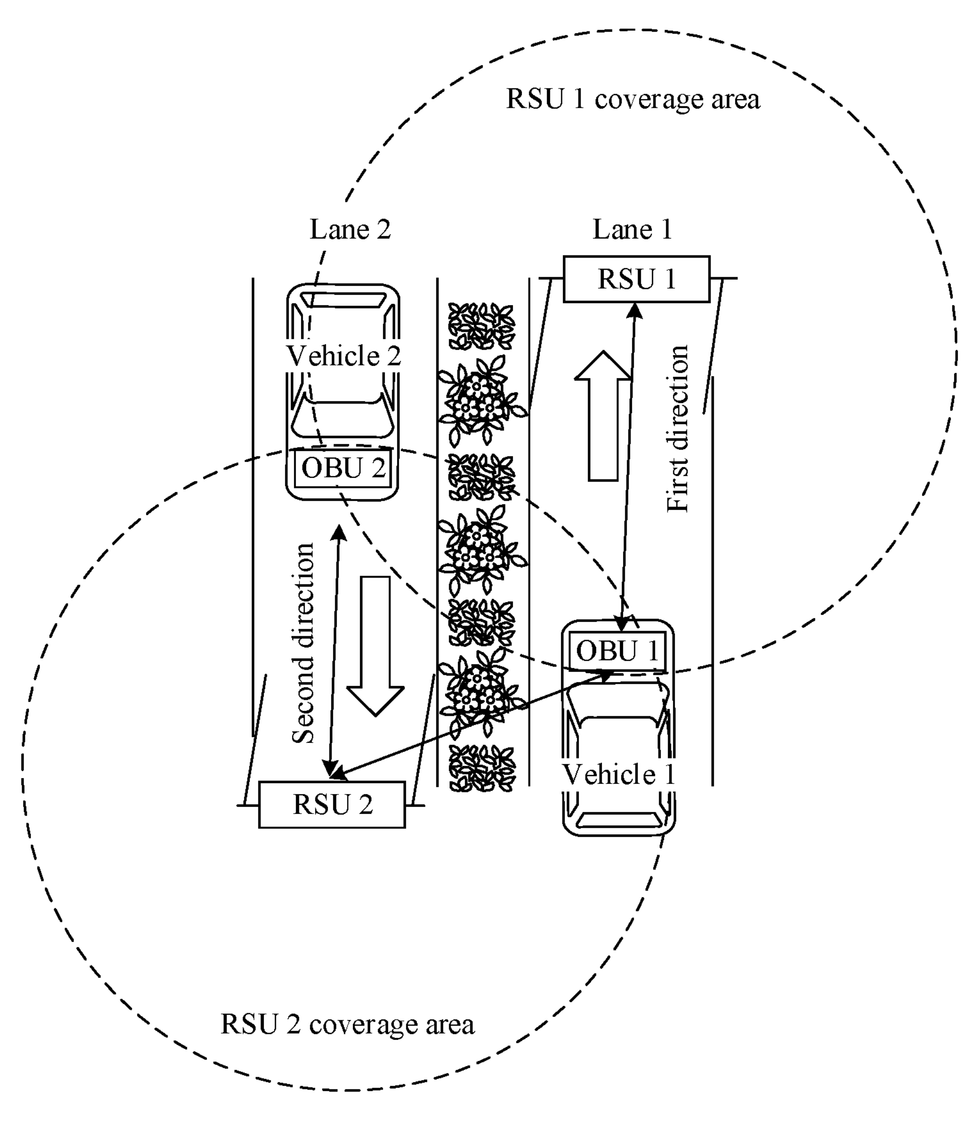
FIG. 5 is a schematic diagram of another ETC toll collection scenario according to an embodiment of this application.

FIG. 5 is a schematic diagram of another current ETC toll collection scenario. As shown in FIG. 5, an RSU 1 is deployed on a lane 1, and an RSU 2 is deployed on a lane 2. A speed direction of a vehicle 1 on the lane 1 is a first direction, and a speed direction of a vehicle 2 on the lane 2 is a second direction. The RSU 1 performs an ETC transaction with an OBU 1 on the vehicle 1, and the RSU 2 performs an ETC transaction with an OBU 2 on the vehicle 2.

In the scenario shown in FIG. 5, because ETC communication is intra-frequency communication, an anti-interference capability is poor, and a beamwidth of a downlink beam of an ETC signal, that is, an angle range covered by the downlink beam, is wide, a problem of incorrect transaction of a reverse lane may occur.

For example, the OBU 1 in FIG. 5 is used as an example. In a process in which the RSU 1 performs an ETC transaction with the OBU 1, the OBU 1 may also enter a coverage area of the RSU 2 on the reverse lane, and the RSU 2 may also perform an ETC transaction with the OBU 1. Therefore, both the RSU 1 and the RSU 2 may perform toll collection on the OBU 1.

In conclusion, a current RSU has poor working efficiency and performance.

To resolve a problem that working efficiency and performance of a current RSU are poor, embodiments of this application provide a communication method, a signal processing apparatus, and a communication apparatus, to improve working efficiency and performance of a sensing and communication integrated communication apparatus.

FIG. 6 is a schematic flowchart of a communication method 200 according to an embodiment of this application. The method 200 may be applied to the system 100 shown in FIG. 2.

Optionally, the method 200 may be performed by the communication apparatus 110 in the system 100 shown in FIG. 2, or may be performed by the communication apparatus 110 under control of the signal processing apparatus 113 in the communication apparatus 110 shown in FIG. 3. For clarity, only an example in which the method 200 is performed by the communication apparatus 110 is used below for description. However, this embodiment of this application is not limited thereto.

S210: Transmit a first radar transmit signal in a first frequency band by using a first transmit antenna array.

S220: Receive a first echo signal of the first radar transmit signal in the first frequency band by using a first receive antenna array, where the first echo signal includes an echo signal corresponding to at least one first terminal.

S230: Communicate with at least one second terminal in a second frequency band by using a second transmit antenna array and a second receive antenna array, where the first frequency band and the second frequency band do not overlap.

In a possible implementation, the second frequency band may include a first sub-frequency band and a second sub-frequency band, and the first sub-frequency band and the second sub-frequency band do not overlap. Correspondingly, S230 may include: receiving a first communication signal from the at least one second terminal in the first sub-frequency band by using the second receive antenna array; and/or transmitting a second communication signal to the at least one second terminal in the second sub-frequency band by using the second transmit antenna array.

It should be noted that, the first communication signal and the second communication signal may support a first communication protocol, that is, the first communication signal and the second communication signal may be understood as signals transmitted during communication by using the first communication protocol.

It should be noted that in this embodiment of this application, that the first communication protocol is an ETC communication protocol is only used as an example for description. However, it should be learned that the first communication protocol may be another communication protocol. This is not limited in embodiments of this application.

The communication apparatus provided in embodiments of this application may be a sensing and communication integrated communication apparatus. To be specific, the communication apparatus has a communication capability, that is, can receive and transmit communication signals (including the first communication signal and/or the second communication signal), to implement communication with a terminal, and has a sensing capability, that is, can receive and transmit radar signals (including the first radar transmit signal and/or the first echo signal). High-precision ranging, speed measurement, angle measurement, and long-distance tracking of the terminal are implemented by using the foregoing communication method.

In a possible implementation, the communication apparatus may implement sensing and communication functions in different frequency bands. For example, the first communication signal and the second communication signal support the ETC communication protocol. The first frequency band may be a frequency band other than the first sub-frequency band and the second sub-frequency band in available frequency bands, and the first frequency band, the first sub-frequency band, and the second sub-frequency band do not overlap.

For example, a working frequency range of a radio communication device in a 5.8 G frequency band is 5725 MHz to 5850 MHz, and the communication apparatus performs ETC communication with a second terminal. FIG. 7 is a schematic diagram of signal frequency band distribution of a sensing and communication integrated communication apparatus. The foregoing frequency band distribution includes at least one of the following: the first sub-frequency band occupied by the first communication signal includes some or all frequencies in a frequency band 2 (5787.5 MHz to 5802.5 MHz), the second sub-frequency band occupied by the second communication signal includes some or all frequencies in a frequency band 4 (5827.5 MHz to 5842.5 MHz), and the first frequency band occupied by the radar signal (including the first radar signal and the first echo signal) includes some or all frequencies in a low frequency band 1 (5725 MHz to 5787.5 MHz), a middle frequency band 3 (5802.5 MHz to 5827.5 MHz) or a high frequency band 5 (5842.5 MHz to 5850 MHz).

It can be learned from FIG. 7 that a maximum bandwidth of the radar signal may be (5787.5−5725)+(5827.5−5802.5)+(5850−5842.5)=95 MHz, a maximum bandwidth of the first communication signal is (5802.5−5787.5)=15 MHz, and a maximum bandwidth of the second communication signal is (5842.5−5827.5)=15 MHz. In other words, a bandwidth of the radar signal is wider than that of the communication signal.

It should be noted that a wider bandwidth indicates higher resolution and higher precision of a signal, thereby indicating a stronger sensing capability. Therefore, resolution and precision of the radar signal are higher. In addition, the radar signal adopts a mechanism of signal coherent accumulation, which determines that a coverage area of the radar signal is larger than that of the communication signal.

According to the communication method provided in this embodiment of this application, the communication apparatus can not only transmit a narrow-bandwidth communication signal, but also transmit a high-bandwidth radar signal with higher precision and a larger coverage area.

Because hardware designs of OBU manufacturers are different, an uplink signal has a specific frequency offset. Therefore, for this frequency offset, a specific guard frequency band needs to be added to a frequency band occupied by the uplink signal (that is, the first communication signal), to avoid mutual interference between the communication signal and the radar signal.

Optionally, a width of the guard frequency band may be 1.2 MHz.

For another example, FIG. 8 is a schematic diagram of another signal frequency band distribution of a sensing and communication integrated communication apparatus. The frequency band distribution includes at least one of the following: the first sub-frequency band occupied by the first communication signal includes some or all frequencies in a frequency band 2 (5787.5 MHz to 5802.5 MHz), the second sub-frequency band occupied by the second communication signal includes some or all frequencies in a frequency band 4 (5827.5 MHz to 5842.5 MHz), and the first frequency band occupied by the radar signal (including the first radar signal and the first echo signal) includes some or all frequencies in a low frequency band 1 (5725 MHz to 5786.3 MHz), a middle frequency band 3 (5803.7 MHz to 5827.5 MHz) or a high frequency band 5 (5842.5 MHz to 5850 MHz). A frequency band shown in a shadow part in FIG. 8 is a guard frequency band.

It should be noted that frequency band distribution of the radar signal and the communication signal shown in FIG. 7 and FIG. 8 is only an example, and this embodiment of this application is not limited thereto. Optionally, the radar signal and the communication signal may alternatively use another frequency band distribution manner. This is not limited in embodiments of this application.

Optionally, the first transmit antenna array and the second transmit antenna array may be the same or different; and/or the first receive antenna array and the second receive antenna array may be the same or different. This is not limited in embodiments of this application.

In a possible implementation, the first transmit antenna array and the second transmit antenna array are different, and the first receive antenna array and the second receive antenna array are different.

In other words, the communication apparatus may include two independent transceiver antenna arrays. The communication apparatus may receive and transmit communication signals (for example, receive an uplink first communication signal and transmit a downlink second communication signal) by using one transceiver antenna array, and receive and transmit radar signals (for example, transmit a first radar signal and receive a first echo signal) by using another transceiver antenna array.

It should be noted that in embodiments of this application, downlink is a transmission direction from the communication apparatus to the terminal, and uplink is a transmission direction from the terminal to the communication apparatus.

In another possible implementation, the first transmit antenna array and the second transmit antenna array are the same, and the first receive antenna array and the second receive antenna array are different.

In other words, the communication apparatus may include one transmit antenna array and two receive antenna arrays. The communication apparatus may transmit a radar signal (for example, a first radar signal) and a downlink communication signal (for example, a second communication signal) by multiplexing the transmit antenna array in a frequency division manner, and respectively receive an echo signal (for example, a first echo signal) and an uplink communication signal (for example, a first communication signal) by using the two receive antenna arrays.

In still another possible implementation, the first transmit antenna array and the second transmit antenna array are different, and the first receive antenna array and the second receive antenna array are the same.

In other words, the communication apparatus may include one receive antenna array and two transmit antenna arrays. The communication apparatus may receive an echo signal (for example, a first echo signal) and an uplink communication signal (for example, a first communication signal) by multiplexing the receive antenna array in a frequency division manner, and respectively transmit a radar signal (for example, a first radar signal) and a downlink communication signal (for example, a second communication signal) by using the two transmit antenna arrays.

In still another possible implementation, the first transmit antenna array and the second transmit antenna array are the same, and the first receive antenna and the second receive antenna array are the same.

That is, the communication apparatus may include only one transceiver antenna array, and the communication apparatus may receive and transmit a communication signal and a radar signal by multiplexing the transceiver antenna array in a frequency division manner.

According to the communication method provided in this embodiment of this application, the communication apparatus implements radar signal receiving and transmitting (for example, transmitting a first radar signal and receiving a first echo signal) and communication signal receiving and transmitting (for example, receiving an uplink first communication signal and transmitting a downlink second communication signal) by multiplexing one transceiver antenna array in a frequency division manner, so that costs and overheads of the communication apparatus can be reduced.

Optionally, the communication apparatus includes one transmit antenna array and one receive antenna array, the transmit antenna array includes a plurality of transmit antennas, and the receive antenna array includes a plurality of receive antennas. S230 may include: The communication apparatus receives a first communication signal from the at least one second terminal in the first sub-frequency band by using the plurality of receive antennas; and/or transmits a second communication signal to the at least one second terminal in the second sub-frequency band by using the plurality of transmit antennas.

Correspondingly, in S210, the communication apparatus may transmit the first radar signal by multiplexing at least two transmit antennas in the plurality of transmit antennas; and/or in S220, the communication apparatus may receive the first echo signal by multiplexing at least two receive antennas in the plurality of receive antennas.

Figures 9, 10:
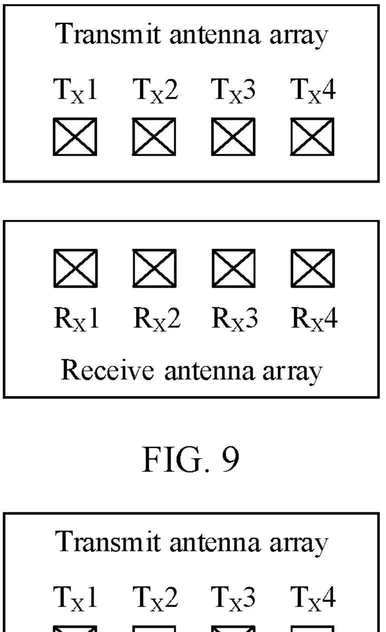
FIG. 9 is a schematic diagram of an antenna array according to an embodiment of this application.
FIG. 10 is a schematic diagram of another antenna array according to an embodiment of this application.

In a possible implementation, for example, the communication apparatus includes a transmit antenna array and a receive antenna array, the transmit antenna array includes four Tx antennas, the receive antenna array includes four Rx antennas, and the four Tx antennas and the four Rx antennas are in a one-row and four-column layout. FIG. 9 is a schematic diagram of an antenna array according to an embodiment of this application. As shown by "□" in FIG. 9, the communication apparatus may transmit the second communication signal by using Tx1 to Tx4 (that is, four Tx antennas), and receive the first communication signal by using Rx1 to Rx4 (that is, four Rx antennas). As shown by "×" in FIG. 9, the communication apparatus may transmit the first radar signal by multiplexing Tx1 to Tx4 (that is, four Tx antennas) in a frequency division manner, and receive the first echo signal by multiplexing Rx1 to Rx4 (that is, four Rx antennas).

It should be noted that, because of the virtual aperture technology based on MIMO radar, four Tx antennas and four Rx antennas used for receiving and transmitting radar signals in FIG. 9 may be equivalent to one Tx antenna and 16 Rx antennas. Therefore, an aperture of a receive antenna array may be extended from four physical receive antennas to 16 virtual receive antennas, so that resolution of a horizontal angle of radar can be improved.

In another possible implementation, for example, the communication apparatus includes a transmit antenna array and a receive antenna array, the transmit antenna array includes four Tx antennas, the receive antenna array includes four Rx antennas, and the four Tx antennas and the four Rx antennas are in a one-row and four-column layout. FIG. 10 is a schematic diagram of another antenna array according to an embodiment of this application. As shown by "□" in FIG. 10, the communication apparatus may transmit the second communication signal by using Tx1 to Tx4 (that is, four Tx antennas), and receive the first communication signal by using Rx1 to Rx4 (that is, four Rx antennas). As shown by "×" in FIG. 10, the communication apparatus may transmit the first radar signal by multiplexing Tx1 and Tx3 (that is, two Tx antennas) in a frequency division manner, and receive the first echo signal by multiplexing Rx2 and Rx4 (that is, two Rx antennas).

It should be noted that, because of the virtual aperture technology based on MIMO radar, two Tx antennas and two Rx antennas used for receiving and transmitting a radar signal in FIG. 10 may be equivalent to one Tx antenna and four Rx antennas. Therefore, an aperture of a receive antenna array may be extended from two physical receive antennas to four virtual receive antennas, that is, a quantity of used antennas can be reduced without reducing resolution of a horizontal angle. This helps reduce complexity of signal processing.

It should be noted that, improving the resolution of the horizontal angle of the radar signal shown in FIG. 9 and FIG. 10 is only an example. Based on a similar principle, the communication apparatus may further improve resolution of a pitch angle of the radar signal, or jointly improve the resolution of the horizontal angle and the pitch angle of the radar signal. Details are not described herein in this embodiment of this application again.

Optionally, the at least one first terminal may include the at least one second terminal. Alternatively, the at least one first terminal and the at least one second terminal are different. This is not limited in embodiments of this application.

In a possible implementation, when the at least one first terminal may include the at least one second terminal, the at least one second terminal may be determined from the at least one first terminal. Specifically, before S230, the communication apparatus may determine the at least one second terminal from the at least one first terminal.

Optionally, the at least one second terminal may include one or more first terminals whose first distance from the first receive antenna array is less than or equal to a first distance threshold and/or whose speed direction is a first direction in the at least one first terminal.

It should be noted that various distances in this application, for example, a distance between the terminal and the first transmit antenna array, a distance between the terminal and the second transmit antenna array, a distance between the terminal and the first receive antenna array, a distance between the terminal and the second receive antenna array, or a distance between the terminal and the communication apparatus, may be mutually converted in some cases. For example, in the communication apparatus, distances of the transmit antenna array, distances of the receive antenna array, or distances between the transmit antenna array and receive antenna array are preset. In this way, other distances may be deduced, calculated, or determined based on one distance, that is, there is a specific conversion relationship between these distances. Therefore, the communication apparatus may obtain another distance based on one of the distances and a relative location relationship between the antenna arrays. In this embodiment of this application, only one distance is used as an example for description. However, this embodiment of this application is not limited thereto.

It should be noted that the first distance threshold may represent a maximum communication distance of a communication signal. That is, when the first distance of the first terminal is less than or equal to the first distance threshold, the first terminal is within the maximum communication distance of the communication signal, that is, the first terminal can communicate with the communication apparatus.

Optionally, because the coverage area of the radar signal is greater than the coverage area of the communication signal, the first distance threshold may be less than a second distance threshold, and the second distance threshold may represent a maximum detection distance of the radar signal. That is, when the first distance of the first terminal is greater than the first distance threshold but less than the second distance threshold, the first terminal may be detected by using a radar signal, but cannot communicate with the communication apparatus.

Optionally, the first distance threshold and/or the second distance threshold may be parameters preconfigured for the communication apparatus.

It should be noted that, the coverage area of the communication signal is a sphere that uses the communication apparatus (or the second transmit antenna array or the second receive antenna array) as a circle center and uses a maximum communication distance (for example, the first distance threshold) of the communication signal as a radius; and/or the coverage area of the radar signal is a sphere that uses the communication apparatus (or the first transmit antenna array or the first receive antenna array) as a circle center and uses a maximum detection distance (for example, the second distance threshold) of the radar signal as a radius.

Optionally, the communication apparatus may determine the at least one second terminal from the at least one first terminal in a plurality of manners. This is not limited in embodiments of this application.

For example, in a possible implementation, the communication apparatus may transmit an activation signal (that is, a communication signal) through broadcasting; receive an answer signal corresponding to the activation signal; and determine at least one first terminal corresponding to the received answer signal as the at least one second terminal. In other words, the at least one second terminal may include one or more first terminals that are in the at least one first terminal and that are successfully activated by the activation signal of the communication apparatus and that transmit an answer signal corresponding to the activation signal to the communication apparatus.

According to the communication method provided in this embodiment of this application, the communication apparatus determines, by broadcasting the activation signal, the at least one activated second terminal, and only needs to simply receive and transmit a signal, without processing the signal, so that processing complexity of the communication apparatus can be reduced.

For another example, in another possible implementation, the communication apparatus may determine the at least one second terminal from the at least one first terminal based on the first echo signal. In other words, the at least one second terminal is determined from the at least one first terminal based on the first echo signal.

Optionally, the communication apparatus may determine, based on the first echo signal, a first distance and/or a speed direction between a first terminal in the at least one first terminal and the first receive antenna array; and determine the at least one second terminal from the at least one first terminal based on the first distance and/or the speed direction between the first terminal in the at least one first terminal and the first receive antenna array.

Further, the first distance between the first terminal in the at least one first terminal and the first receive antenna array may be indicated by using first distance information; and/or the speed direction of the first terminal in the at least one first terminal may be indicated by using speed information.

Alternatively, the communication apparatus may determine the first distance information and/or the speed information based on the first echo signal, and determine the at least one second terminal from the at least one first terminal based on the first distance information and/or the speed information.

For example, the first radar signal is a frequency modulated continuous wave (frequency modulated continuous wave, FMCW). The communication apparatus may perform first-dimensional fast Fourier transform (fast Fourier transformation, FFT) on a demodulated signal of the first echo signal to obtain a distance spectrum (that is, first distance information), and obtain a first distance between each first terminal of the at least one first terminal and the first receive antenna array based on the distance spectrum. For details, refer to the conventional technology. A manner of obtaining the first distance is not specifically limited in this embodiment of this application.

For example, the first radar transmit signal is an FMCW. The communication apparatus may perform second-dimensional FFT on the demodulated signal of the first echo signal to obtain a Doppler velocity spectrum (that is, speed information), and obtain a speed of each of the at least one first terminal based on the Doppler velocity spectrum. For details, refer to the conventional technology. A manner of obtaining the speed of the first terminal is not specifically limited in this embodiment of this application.

It should be noted that because the speed is a vector, that is, has a direction, a speed direction of each first terminal may be obtained by obtaining a speed of each first terminal of the at least one first terminal.

It should be further noted that the speed direction in this embodiment of this application mainly includes a traveling direction towards the communication apparatus (that is, the first direction) or a traveling direction away from the communication apparatus.

According to the communication method provided in this embodiment of this application, because a radar signal has a large coverage area, high resolution, and a strong perception capability, precision of the first distance information and/or the speed information of the at least one first terminal that is detected based on the radar signal is high. Further, the communication apparatus can communicate with the at least one second terminal more accurately, thereby improving a communication success rate and communication efficiency.

Figure 11:
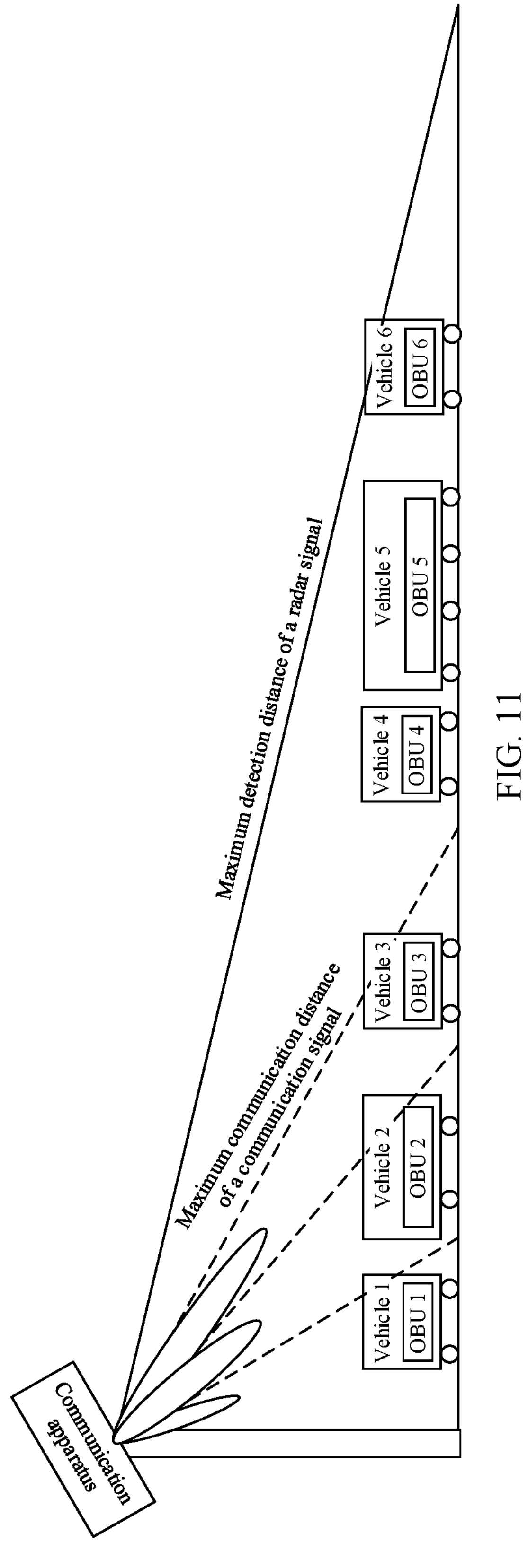
FIG. 11 is a schematic diagram of another application scenario according to an embodiment of this application.

For example, FIG. 11 is a schematic diagram of another application scenario according to an embodiment of this application. As shown in FIG. 11, the communication apparatus may track an OBU 1 to an OBU 6 in a coverage area of a radar signal in real time by using the radar signal, and measure a first distance between each OBU and the communication apparatus based on an echo signal. When the communication apparatus detects that the first distances to the OBU 1, the OBU 2, and the OBU 3 each are less than or equal to a maximum communication distance of a communication signal, the communication apparatus determines that the OBU 1, the OBU 2, and the OBU 3 are within a coverage area of the communication signal, and then communicates with the OBU 1 and the OBU 2. This can improve a communication success rate.

Figure 12:
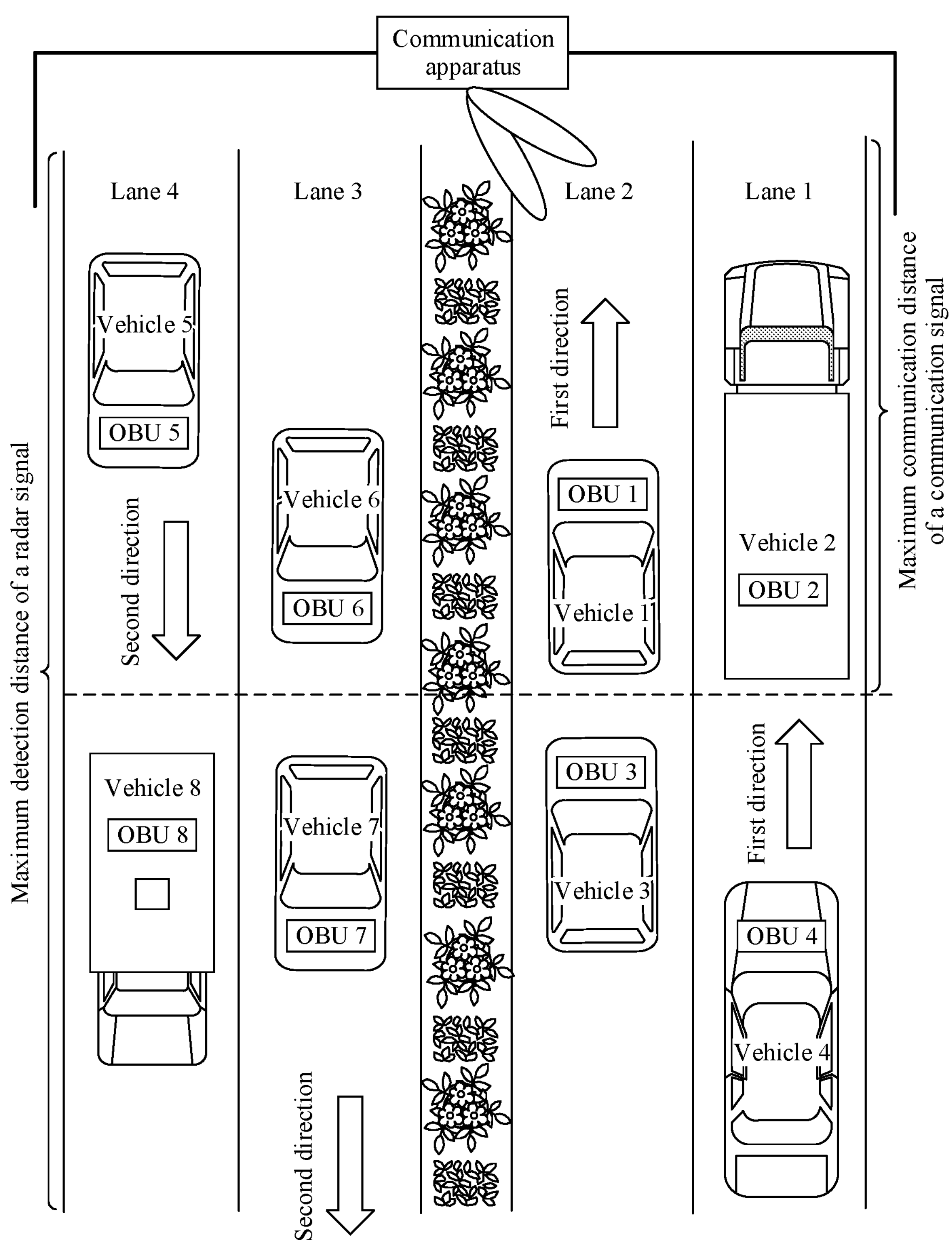
FIG. 12 is a schematic diagram of still another application scenario according to an embodiment of this application.

For another example, FIG. 12 is a schematic diagram of still another application scenario according to an embodiment of this application. As shown in FIG. 12, the communication apparatus may track an OBU 1 to an OBU 6 in real time in a coverage area of a radar signal by using the radar signal, and measure a first distance between each OBU and the communication apparatus and a speed direction of each OBU based on an echo signal. When the communication apparatus detects that first distances to the OBU 1 and the OBU 2 each are less than or equal to a maximum communication distance of a communication signal and speed directions are the first direction, the communication apparatus determines that the OBU 1 and the OBU 2 are in a coverage area of the communication signal and that traveling directions are correct, and then communicates with the OBU 1 and the OBU 2. This can avoid an error of repeated transaction on a reverse lane.

In a possible implementation, in S230, the communication apparatus may receive the first communication signal from the at least one second terminal in the first sub-frequency band by using the second receive antenna array, and transmit the second communication signal to the at least one second terminal in the second sub-frequency band by using the second transmit antenna array.

Optionally, the communication apparatus may transmit the second communication signal to the at least one second terminal in the second sub-frequency band by using the second transmit antenna array in a plurality of manners. This is not limited in embodiments of this application.

The following describes, by using Manner 1 to Manner 3 as an example, a process in which the communication apparatus transmits the second communication signal to the at least one second terminal by using the second transmit antenna array. However, this embodiment of this application is not limited thereto.

Manner 1: The communication apparatus may transmit the second communication signal to the at least one second terminal in the second frequency band based on the first communication signal by using the second transmit antenna array.

Specifically, the second communication signal is transmitted after beamforming is performed, by using first angle information, on a signal transmitted by the second transmit antenna array, where the first angle information is obtained based on a first communication signal from the at least one second terminal, and the first angle information is used to indicate at least one of a horizontal angle or a pitch angle of the at least one second terminal relative to the second transmit antenna array.

In other words, the communication apparatus may obtain the first angle information based on the first communication signal from the at least one second terminal, perform, based on the first angle information, beamforming on a downlink communication signal transmitted by the second transmit antenna array, and transmit, to each second terminal of the at least one second terminal, a beamformed second communication signal corresponding to each second terminal.

It should be noted that the communication apparatus performs a separate operation on the first communication signal of each second terminal, to obtain an angle (including a horizontal angle and/or a pitch angle) of each second terminal relative to the second transmit antenna array. Similarly, the communication apparatus performs, based on the angle of each second terminal relative to the second transmit antenna array, beamforming on a signal transmitted by the second transmit antenna array, and separately transmits, to each second terminal, a beamformed second communication signal corresponding to each second terminal.

It should be noted that various angles (including a horizontal angle and/or a pitch angle) in this embodiment of this application, for example, an angle of the terminal relative to the first transmit antenna array, an angle of the terminal relative to the second transmit antenna array, an angle of the terminal relative to the first receive antenna array, an angle of the terminal relative to the second receive antenna array, or an angle of the terminal relative to the communication apparatus, may be mutually converted in some cases. For example, in the communication apparatus, an angle relationship of each transmit antenna array, an angle relationship of each receive antenna array, or an angle relationship between each transmit antenna array and each receive antenna array is preset. In this way, another angle may be deduced, calculated, or determined based on one angle, that is, there is a conversion relationship between these angles. Therefore, the communication apparatus may obtain another angle based on one of the angles and a relative angle relationship between the antenna arrays. In this embodiment of this application, only one angle is used as an example for description. However, this embodiment of this application is not limited thereto.

That is, the first angle information may include a horizontal angle and/or a pitch angle of the at least one second terminal relative to the second transmit antenna array; or the first angle information may include a horizontal angle and/or a pitch angle of the at least one second terminal relative to the second receive antenna array; or the first angle information may include a horizontal angle and/or a pitch angle of the at least one second terminal relative to the communication apparatus.

For example, the communication apparatus may perform first-dimensional FFT on a demodulated signal of the first communication signal of the second terminal, to obtain a horizontal angle of the second terminal relative to the second receive antenna array; and/or perform second-dimensional FFT on the demodulated signal of the first communication signal of the second terminal, to obtain a pitch angle of the second terminal relative to the second receive antenna array. For details, refer to the conventional technology. A manner of obtaining an angle of the second terminal relative to the second receive antenna array is not specifically limited in this embodiment of this application.

Figures 13, 14:
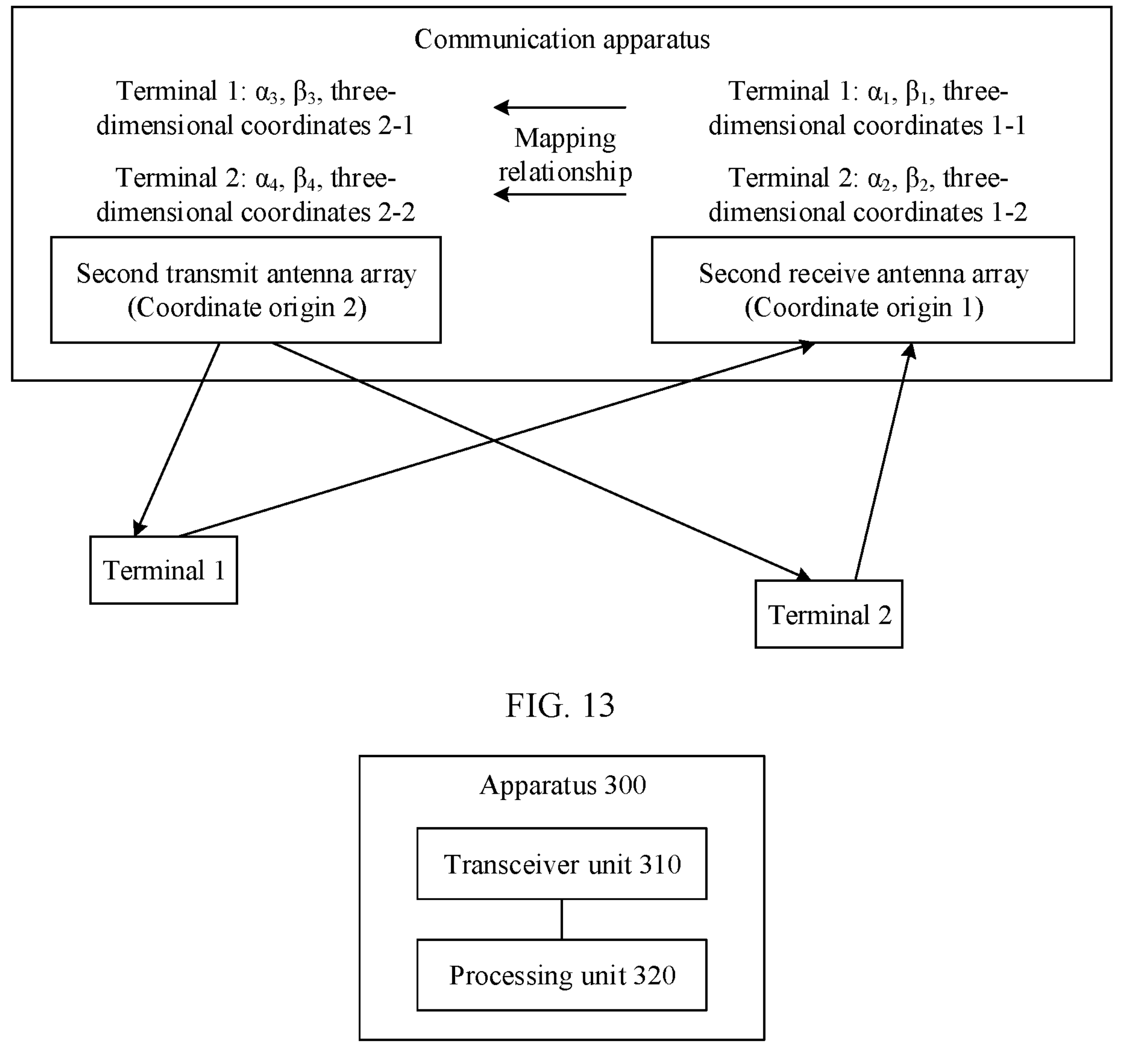
FIG. 13 is a schematic diagram of communication between a communication apparatus and a second terminal according to an embodiment of this application.
FIG. 14 is a schematic block diagram of a communication apparatus 300 according to an embodiment of this application.

For another example, FIG. 13 is a schematic diagram of communication between the communication apparatus and a second terminal. As shown in FIG. 13, that the at least one second terminal includes a terminal 1 and a terminal 2 is used as an example. The communication apparatus may determine, based on a first communication signal of the terminal 1, a horizontal angle $\alpha_1$ and a pitch angle $\beta_1$ of the terminal 1 relative to the second receive antenna array. Similarly, the communication apparatus may determine, based on the first communication signal of the terminal 2, a horizontal angle $\alpha_2$ and a pitch angle $\beta_2$ of the terminal 2 relative to the second receive antenna array.

Further, the communication apparatus may determine, based on the horizontal angle $\alpha_1$ and the pitch angle $\beta_1$, coordinates 1 of the terminal 1 relative to a coordinate origin 1 corresponding to the second receive antenna array, for example, three-dimensional coordinates 1-1; determine, based on the three-dimensional coordinates 1-1 and a predefined first mapping relationship, three-dimensional coordinates 2-1 of the terminal 1 relative to a coordinate origin 2 corresponding to the second transmit antenna array, where the first mapping relationship is used to represent three-dimensional coordinate variations of the terminal relative to the coordinate origin 1 and the coordinate origin 2; determine, based on the three-dimensional coordinates 2-1, a horizontal angle $\alpha_3$ and a pitch angle $\beta_3$ of the terminal 1 relative to the second transmit antenna array; and transmit a second communication signal corresponding to the terminal 1 to the terminal 1 after performing, based on the horizontal angle $\alpha_3$ and the pitch angle $\beta_3$, beamforming on a signal transmitted by the second transmit antenna array. Similarly, the communication apparatus may determine, based on the horizontal angle $\alpha_2$ and the pitch angle $\beta_2$, coordinates 2 of the terminal 2 relative to the coordinate origin 1, for example, three-dimensional coordinates 1-2; and determine, based on the three-dimensional coordinates 1-2 and the first mapping relationship, three-dimensional coordinates 2-2 of the terminal 2 relative to the coordinate origin 2; determine, based on the three-dimensional coordinates 2-2, a horizontal angle $\alpha_4$ and a pitch angle $\beta_4$ of the terminal 2 relative to the second transmit antenna array; and transmit a second communication signal corresponding to the terminal 2 to the terminal 2 after performing, based on the horizontal angle $\alpha_4$ and the pitch angle $\beta_4$, beamforming on a signal transmitted by the second transmit antenna array.

It should be noted that the solution described in the previous paragraph may alternatively be replaced with the following: The communication apparatus may determine, based on the horizontal angle $\alpha_1$, the pitch angle $\beta_1$, and a predefined second mapping relationship, the horizontal angle $\alpha_3$ and the pitch angle $\beta_3$ of the terminal 1 relative to the second transmit antenna array, where the second mapping relationship is used to indicate angle variations of the terminal relative to the coordinate origin 1 and the coordinate origin 2; and transmit a second communication signal corresponding to the terminal 1 to the terminal 1 after performing, based on the horizontal angle $\alpha_3$ and the pitch angle $\beta_3$, beamforming on a signal transmitted by the second transmit antenna array. Similarly, the communication apparatus may determine, based on the horizontal angle $\alpha_2$, the pitch angle $\beta_2$, and the second mapping relationship, the horizontal angle $\alpha_4$ and the pitch angle $\beta_4$ of the terminal 2 relative to the second transmit antenna array; and transmit a second communication signal corresponding to the terminal 2 to the terminal 2 after performing, based on the horizontal angle $\alpha_4$ and the pitch angle $\beta_4$, beamforming on a signal transmitted by the second transmit antenna array.

In other words, the communication apparatus does not need to obtain coordinates (for example, the three-dimensional coordinates 1-1 and the three-dimensional coordinates 2-1, and/or the three-dimensional coordinates 1-2 and the three-dimensional coordinates 2-2) of each terminal, that is, the coordinates of each terminal may not be reflected as an intermediate result.

It should be noted that, according to the solution described in FIG. 13, an angle (including a horizontal angle and/or a pitch angle) of the second terminal relative to the second receive antenna array may be equivalently converted into an angle of the second terminal relative to the second transmit antenna array. Optionally, the communication apparatus may further perform other equivalent conversion on the angle of the second terminal relative to the second receive antenna array by using a method similar to that described in FIG. 13. Details are not described again in this embodiment of this application again.

According to the communication method provided in this embodiment of this application, the communication apparatus may accurately guide beamforming of a downlink communication signal as much as possible by using a sensing capability of an uplink first communication signal, thereby improving work efficiency and performance of the sensing and communication integrated communication apparatus.

Manner 2: The communication apparatus may transmit the second communication signal to at least one third terminal in the second frequency band based on the first communication signal and the second echo signal by using the second transmit antenna array, where the at least one second terminal includes the at least one third terminal, and the second echo signal includes an echo signal corresponding to the at least one second terminal.

Optionally, the communication apparatus may obtain the second echo signal in a plurality of manners. This is not limited in embodiments of this application.

In a first possible implementation, the communication apparatus may obtain the second echo signal from the first echo signal. In other words, the first echo signal includes the second echo signal.

In a second possible implementation, the communication apparatus may transmit a second radar signal in the first frequency band by using the first transmit antenna array; and receive the second echo signal of the second radar signal in the first frequency band by using the first receive antenna array.

Optionally, the second radar signal may be a radar signal transmitted by the communication apparatus after the first radar signal.

Specifically, the second communication signal is transmitted after beamforming is performed, by using second angle information and third angle information, on the signal transmitted by the second transmit antenna array. The second angle information is used to indicate a pitch angle of the at least one third terminal relative to the second transmit antenna array, the third angle information is used to indicate a horizontal angle of the at least one third terminal relative to the first transmit antenna array, the second angle information is obtained based on the first communication signal from the at least one third terminal, and the third angle information is obtained based on the second echo signal.

That is, the communication apparatus may obtain the second angle information and the third angle information based on the first communication signal from the at least one third terminal and the second echo signal; and perform, based on the second angle information and the third angle information, beamforming on the downlink communication signal transmitted by the second transmit antenna array, and transmit, to each third terminal of the at least one third terminal, a beamformed second communication signal corresponding to each third terminal.

It should be noted that for details of the second angle information and the third angle information, refer to the description of the first angle information in Manner 1. Details are not described in this embodiment of this application again.

For example, the third angle information includes the horizontal angle of the at least one third terminal relative to the first transmit antenna array. The communication apparatus may perform third-dimensional FFT on a demodulated signal of the second echo signal, to obtain the third angle information. For details, refer to the conventional technology. A manner of obtaining the third angle information is not specifically limited in this embodiment of this application.

According to the communication method provided in this embodiment of this application, because resolution of a horizontal angle of a radar signal is higher, replacing the uplink first communication signal with the second radar signal to sense the horizontal angle of the at least one third terminal can optimize beamforming precision of the downlink communication signal, thereby improving work efficiency and performance of the sensing and communication integrated communication apparatus.

In addition, the second echo signal obtained by the communication apparatus based on the second radar signal transmitted after the first radar signal (that is, based on the second echo signal obtained in the foregoing second manner) has better real-time performance, and can be used to obtain third angle information with high precision, which can be used to further optimize beamforming precision of a downlink communication signal, thereby improving work efficiency and performance of the sensing and communication integrated communication apparatus.

Optionally, the at least one third terminal is determined from the at least one second terminal. In other words, before the communication apparatus transmits the second communication signal to the at least one third terminal by using the second transmit antenna array, the communication apparatus may determine the at least one third terminal from the at least one second terminal.

Specifically, the at least one third terminal may include one or more second terminals whose distance difference is less than or equal to a third distance threshold in the at least one second terminal, where the distance difference of the second terminal indicates a difference between a second distance between the second terminal and the first receive antenna array and a third distance between the second terminal and the second receive antenna array, where the second distance between the at least one second terminal and the first receive antenna array is obtained based on the second echo signal, and the third distance between the at least one second terminal and the second receive antenna array is determined based on the first communication signal of the at least one second terminal.

Optionally, the second distance is indicated by using second distance information, and the third distance is indicated by using third distance information. In other words, the communication apparatus may determine the second distance information based on the second echo signal; determine the second distance between the at least one second terminal and the first receive antenna array based on the second distance information; determine the third distance information of the at least one second terminal based on the first communication signal from the at least one second terminal; determine the third distance between the at least one second terminal and the second receive antenna array based on the third distance information; and determine the second distance between the at least one second terminal and the first receive antenna array and the third distance between the at least one second terminal and the second receive antenna array based on the second distance information, and determine the at least one third terminal from the at least one second terminal.

For example, the communication apparatus may determine, based on the first communication signal of the second terminal, a horizontal angle and a pitch angle (the third distance information) of the second terminal relative to the second receive antenna array, and determine, based on the horizontal angle and the pitch angle, the third distance of the second terminal relative to the second receive antenna array. For details, refer to the conventional technology. A manner of obtaining the third distance is not specifically limited in this embodiment of this application.

It should be noted that, for details of the second distance, refer to the foregoing description of the first distance. Details are not described herein in this embodiment of this application again.

It should be noted that the third distance threshold may be understood as an error threshold between the second distance determined based on the radar signal and the third distance determined based on the communication signal. That is, when the difference is less than or equal to the third distance threshold, the communication apparatus may determine that the distances of the second terminals that are determined based on the second echo signal and the first communication signal are approximately consistent. Alternatively, when the difference is greater than the third distance threshold, the communication apparatus may determine that the distances of the second terminal determined by using the second echo signal and the first communication signal are inconsistent.

Optionally, the third distance threshold may be a parameter preconfigured for the communication apparatus.

According to the communication method provided in this embodiment of this application, the communication apparatus excludes, from the at least one second terminal, a second terminal whose distance determined based on a radar signal and a communication signal is inconsistent, so as to avoid a case in which a second communication signal corresponding to the second terminal cannot be accurately transmitted to the second terminal due to incorrect distance determining of the second terminal, thereby improving beamforming precision of a downlink communication signal, and improving work efficiency and performance of the sensing and communication integrated communication apparatus.

Manner 3: The communication apparatus may transmit the second communication signal to the at least one second terminal in the second frequency band based on the second echo signal by using the second transmit antenna array, where the second echo signal includes an echo signal corresponding to the at least one second terminal.

Optionally, for a specific manner of obtaining the second echo signal by the communication apparatus, refer to the description in Manner 2. Details are not described herein again in this embodiment of this application again.

Specifically, the second communication signal is transmitted after beamforming is performed, by using fourth angle information, on a signal transmitted by the second transmit antenna array, where the fourth angle information is obtained based on the second echo signal, and the fourth angle information is used to indicate at least one of a horizontal angle or a pitch angle of the at least one second terminal relative to the second transmit antenna array.

In other words, the communication apparatus may obtain the fourth angle information based on the second echo signal, perform, based on the fourth angle information, beamforming on the downlink communication signal transmitted by the second transmit antenna array, and transmit, to each second terminal of the at least one second terminal, a beamformed second communication signal corresponding to each second terminal.

For example, that the fourth angle information includes the horizontal angle and/or the pitch angle of the at least one second terminal relative to the second receive antenna array is used as an example. The communication apparatus may perform third-dimensional FFT on a demodulated signal of the second echo signal, to obtain the horizontal angle of the at least one second terminal relative to the second receive antenna array; and/or perform fourth-dimensional FFT on the demodulated signal of the second echo signal, to obtain a pitch angle of the at least one second terminal relative to the second receive antenna array. For details, refer to the conventional technology and the foregoing descriptions about angle information. This is not specifically limited in this application.

In addition, when the at least one second terminal includes at least two second terminals that belong to different lanes (for example, the OBU 1 and the OBU 2 in FIG. 12), the communication apparatus can communicate with second terminals on a plurality of lanes as accurately as possible by using any one of the foregoing manners 1 to 3. In other words, only one sensing and communication integrated communication apparatus provided in this embodiment of this application needs to be installed on the plurality of lanes, so that multi-lane coverage and multi-lane vehicle sensing can be implemented, thereby reducing costs and maintenance amounts.

Optionally, the method 200 may further include: The communication apparatus inspects, based on the first echo signal and the first communication signal, a vehicle violating traffic rules in the at least one second terminal.

Specifically, the vehicle violating traffic rules include a second terminal that is in the at least one second terminal and whose first vehicle model fails to match a second vehicle model, the first vehicle model represents a real vehicle model of the second terminal, and the second vehicle model represents a vehicle model reported by the second terminal.

In a possible implementation, the first vehicle model may be indicated by using first vehicle model information, the second vehicle model may be indicated by using second vehicle model information, the first vehicle model information is obtained based on a first echo signal, and the second vehicle model information is indicated by using a first communication signal from the second terminal.

In other words, the communication apparatus may determine the first vehicle model information of the second terminal based on the first echo signal, where the first vehicle model information is used to indicate the first vehicle model of the second terminal; obtain the second vehicle model information indicated by the first communication signal from the second terminal, where the second vehicle model information is used to indicate the second vehicle model of the second terminal; and match the first vehicle model with the second vehicle model; and if the matching fails, a vehicle in which the second terminal is located is a vehicle violating traffic rules.

Optionally, vehicle types (including the first vehicle type and/or the second vehicle type) in this embodiment of this application may include a large vehicle, a medium vehicle, or a small vehicle.

For example, the first radar signal is a frequency modulated continuous wave FMCW. The communication apparatus may perform first-dimensional FFT on a demodulated signal of the first echo signal to obtain a distance spectrum, and determine the first vehicle model of the second terminal based on the distance spectrum. Specifically, the communication apparatus may determine a vehicle length of the second terminal based on the distance spectrum. The vehicle length of the second terminal may be a distance difference between the first receive antenna array and a vehicle head and a vehicle rear of the vehicle in which the second terminal is located.

According to the communication method provided in this embodiment of this application, the communication apparatus may assist a traffic management department in inspecting a vehicle violating traffic rules by using an uplink first communication signal and a first echo signal.

Optionally, when the communication apparatus inspects that the vehicle in which a at least one second target terminal is located is a vehicle violating traffic rules, the communication apparatus may give an alarm, prompt, and/or further track the at least one second target terminal. The at least one second terminal includes the at least one second target terminal. This is not limited in embodiments of this application.

In a possible implementation, the communication apparatus may determine location information of the at least one second target terminal based on a first communication signal from the at least one second target terminal, and transmit the location information of the at least one second target terminal to a camera apparatus, where the location information of the at least one second target terminal is used to position the at least one second target terminal.

Specifically, the communication apparatus may determine first angle information of the at least one second target terminal based on the first communication signal from the at least one second target terminal, where the first angle information is used to indicate a horizontal angle and/or a pitch angle between the second target terminal and the second transmit antenna array; and determine the location information of the at least one second target terminal based on the first angle information of the at least one second target terminal.

Correspondingly, the camera apparatus may capture an image of the at least one second target terminal in real time based on the location information of the at least one second target terminal, and perform tracking processing on the at least one second target terminal based on the image of the at least one second target terminal.

According to the communication method provided in this embodiment of this application, the communication apparatus may position the second target terminal in real time based on a first communication signal from the second target terminal on the vehicle violating traffic rules, and assist the camera apparatus in further tracking based on the positioning.

The foregoing describes, with reference to FIG. 6 to FIG. 13, the communication method 200 provided in embodiments of this application. The following describes, with reference to FIG. 14 to FIG. 17, a communication apparatus configured to perform the foregoing method 200.

It should be noted that the communication apparatus may be the communication apparatus in the embodiment of the foregoing method 200, and can perform the method implemented by the communication apparatus in the foregoing method 200.

It may be understood that, to implement the foregoing functions, the communication apparatus includes corresponding hardware structures and/or software modules for performing the functions. With reference to algorithm steps of examples described in embodiments disclosed in this specification, this application can be implemented in a form of hardware or a combination of hardware and computer software. Whether a function is performed by hardware or hardware driven by computer software depends on particular applications and design constraints of the technical solution. A person skilled in the art may use different methods to implement the described functions for each particular application scenario, but it should not be considered that the implementation goes beyond the scope of this application.

In this embodiment, the communication apparatus may be divided into function modules based on the method examples. For example, each function module may be obtained through division based on each corresponding function, or two or more functions may be integrated into one processing module. The integrated module may be implemented in a form of hardware. It should be noted that, in embodiments, division into the modules is an example, is merely logical function division, and may be other division during actual implementation.

When each function module is obtained through division based on each corresponding function, FIG. 14 is a possible schematic composition diagram of the communication apparatus in the foregoing embodiments. As shown in FIG. 14, the apparatus 300 may include a transceiver unit 310 and a processing unit 320.

The processing unit 320 may control the transceiver unit 310 to implement the method performed by the communication apparatus in the foregoing method 200 embodiment, and/or another process of the technology described in this specification. The transceiver unit 310 is a functional representation of the transmit antenna array and/or the receive antenna array in the foregoing embodiments of the method 200.

It should be noted that all related content of the steps in the foregoing method embodiments may be cited in function description of corresponding functional modules. Details are not described herein again.

When an integrated unit is used, the apparatus 300 may include a processing unit, a storage unit, and a communication unit. The processing unit may be configured to control and manage an action of the apparatus 300, for example, may be configured to support the apparatus 300 in performing steps performed by the foregoing units. The storage unit may be configured to support the apparatus 300 in storing program code, data, and the like. The communication unit may be configured to support the apparatus 300 in communicating with another device.

The processing unit may be a processor or a controller. The processing apparatus may implement or execute various example logical blocks, modules, and circuits described with reference to content disclosed in this application. Alternatively, the processor may be a combination of processors implementing a computing function, for example, a combination of one or more microprocessors, or a combination of a digital signal processor (digital signal processor, DSP) and a microprocessor. The storage unit may be a memory. The communication unit may be specifically a device that interacts with another electronic device, like a radio frequency circuit, a Bluetooth chip, or a Wi-Fi chip.

Figure 15:
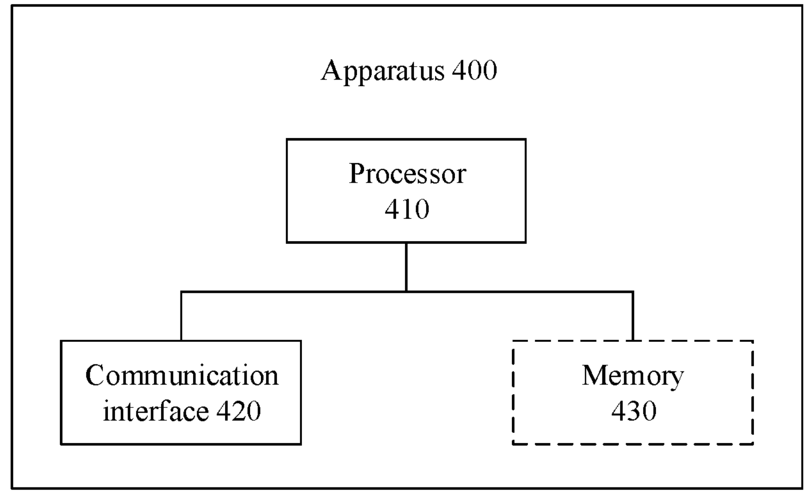
FIG. 15 is a schematic block diagram of a signal processing apparatus 400 according to an embodiment of this application.

In a possible implementation, the signal processing apparatus in this embodiment of this application may be an apparatus 400 with a structure shown in FIG. 15. The apparatus 400 includes at least one processor 410 and at least one communications interface 420. The processor 410 and the communications interface 420 communicate with each other over an internal connection path. A related function implemented by the processing unit 320 in FIG. 14 may be implemented by the processor 410, and a related function implemented by the transceiver unit 310 may be implemented by the processor 410 by controlling a first transmit antenna array and a first receive antenna array by using the communications interface 420.

Further, a related function implemented by the transceiver unit 310 may be implemented by the processor 410 by controlling the first transmit antenna array and the first receive antenna array, and a second transmit antenna array and/or a second receive antenna array by using the communications interface 420.

Optionally, the apparatus 400 may further include a memory 430. The processor 410, the communications interface 420, and the memory 430 communicate with each other over an internal connection path. A related function implemented by the storage unit in FIG. 14 may be implemented by the memory 430.

An embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to enable the chip to perform the communication method in the foregoing method embodiments.

Figure 16:
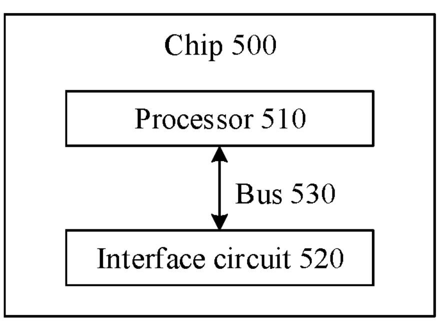
FIG. 16 is a schematic block diagram of a chip 500 according to an embodiment of this application.

FIG. 16 is a schematic diagram of a structure of a chip 500. The chip 500 includes one or more processors 510 and an interface circuit 520. Optionally, the chip 500 may further include a bus 530.

The processor 510 may be an integrated circuit chip and has a signal processing capability. In an implementation process, steps of the method may be completed by using an integrated logic circuit of hardware in the processor 510 or instructions in a form of software. The processor 510 may be a general-purpose processor, a digital signal processor (digital signal processor, DSP), an application-specific integrated circuit (application-specific integrated circuit, ASIC), a field-programmable gate array (field-programmable gate array, FPGA), another programmable logic device, a discrete gate or a transistor logic device, or a discrete hardware component. The processor 510 may implement or perform the methods and steps that are disclosed in embodiments of this application. The general-purpose processor may be a microprocessor, or the processor may be any conventional processor or the like.

The interface circuit 520 may be configured to transmit a radar signal and/or a communication signal; and/or receive a radar signal and/or a communication signal. Optionally, the interface circuit may be one or more interface circuits.

The processor 510 controls, by using the interface circuit, a second receive antenna array to receive a communication signal from a terminal, and controls a second transmit antenna array to transmit a communication signal to the terminal. For radar signal receiving and transmitting, based on a structure composition of a communication apparatus in which the chip is located, there are the following several possible implementations.

In a first implementation, the communication apparatus includes the second transmit antenna array and the second receive antenna array. The processor 510 controls, by using the interface circuit, the second transmit antenna array to transmit the radar signal, and controls the second receive antenna array to receive an echo signal of the radar signal.

In a second implementation, the communication apparatus includes the second transmit antenna array, the second receive antenna array, and a first transmit antenna array. The processor 510 controls, by using the interface circuit, the first transmit antenna array to transmit the radar signal, and controls the second receive antenna array to receive the echo signal of the radar signal.

In a third implementation, the communication apparatus includes the second transmit antenna array, the second receive antenna array, and a first receive antenna array. The processor 510 controls, by using the interface circuit, the second transmit antenna array to transmit the radar signal, and controls the first receive antenna array to receive the echo signal of the radar signal.

In a fourth implementation, the communication apparatus includes the second transmit antenna array, the second receive antenna array, the first transmit antenna array, and the first receive antenna array. The processor 510 controls, by using the interface circuit, the first transmit antenna array to transmit the radar signal, and controls the first receive antenna array to receive the echo signal of the radar signal.

Optionally, the chip further includes a memory. The memory may include a read-only memory (Read Only Memory, ROM) and/or a random access memory (Random Access Memory, RAM), and provides operation instructions and data for the processor. A part of the memory may further include a non-volatile random access memory (non-volatile random access memory, NVRAM).

Optionally, the memory stores an executable software module or a data structure, and the processor may perform a corresponding operation by invoking operation instructions (the operation instructions may be stored in an operating system) stored in the memory.

Optionally, the chip may be used in the communication apparatus in embodiments of this application. Optionally, the interface circuit 520 may be configured to output an execution result of the processor 510. For the communication method provided in one or more embodiments of this application, refer to the foregoing embodiments. Details are not described herein again.

It should be noted that functions corresponding to each of the processor 510 and the interface circuit 520 may be implemented by using a hardware design, may be implemented by using a software design, or may be implemented by combining software and hardware. This is not limited herein.

An embodiment of this application further provides a communication apparatus. For example, the communication apparatus may be a road side unit (RSU). The RSU may include the apparatus 400 in FIG. 15 or the chip 500 in FIG. 16, a second transmit antenna array, and a second receive antenna array.

Optionally, the communication apparatus may further include a first transmit antenna array and/or a first receive antenna array.

Figure 17:
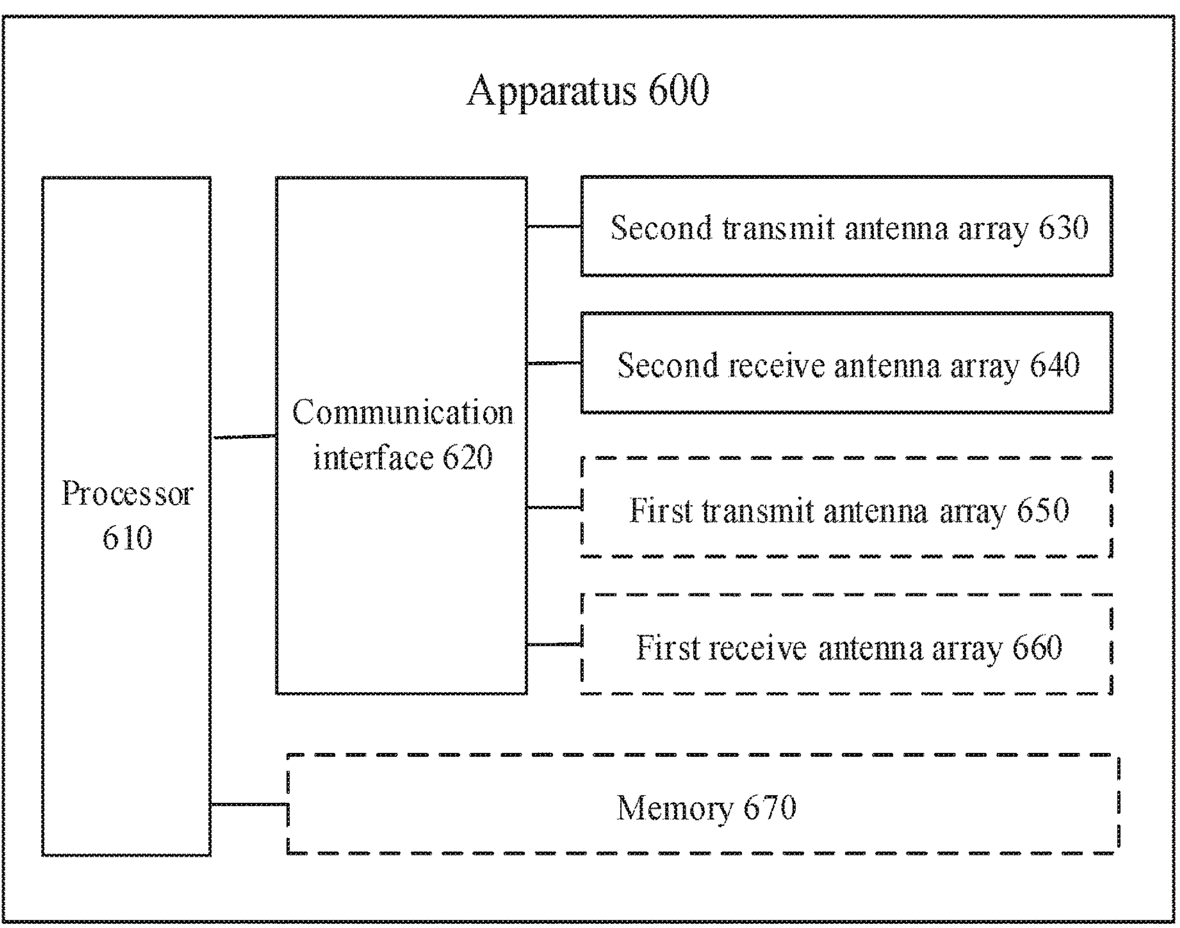
FIG. 17 is a schematic block diagram of a communication apparatus 600 according to an embodiment of this application.

In a possible implementation, FIG. 17 is a schematic block diagram of a communication apparatus 600 according to an embodiment of this application. As shown in FIG. 17, the apparatus 600 may include a processor 610, a communication interface 620, a second transmit antenna array 630, and a second receive antenna array 640. The processor 610, the communication interface 620, the second transmit antenna array 630, and the second receive antenna array 640 are coupled.

The processor 610 is configured to control, by using the communication interface 620, the second transmit antenna array 630 and the second receive antenna array 640 to perform the communication method in the embodiment of the method 200.

Optionally, the communication interface 620 may be one or more communication interfaces.

For example, the second transmit antenna array 630 may include a plurality of transmit antennas, and the second receive antenna array 640 may include a plurality of receive antennas. The processor 610 is configured to control the plurality of transmit antennas and the plurality of receive antennas to receive and transmit communication signals, and/or control one or more of the plurality of transmit antennas and one or more of the plurality of receive antennas to receive and transmit radar signals. Further, the communication signal and the radar signal occupy different frequency bands.

Optionally, the apparatus 600 may further include a first transmit antenna array 650 and/or a first receive antenna array 660.

Further, the processor 610 is configured to control, by using the communication interface 620, the second transmit antenna array 630, the second receive antenna array 640, the first transmit antenna array 650, and/or the first receive antenna array 660 to perform the communication method in the embodiment of the method 200.

For example, the processor 610 is configured to control the second transmit antenna array 630 and the second receive antenna array 640 to receive and transmit a communication signal; and/or control the first transmit antenna array 650 and the first receive antenna array 660 to receive and transmit a radar signal. Further, the communication signal and the radar signal occupy different frequency bands.

For another example, the processor 610 is configured to control the second transmit antenna array 630 and the second receive antenna array 640 to receive and transmit a communication signal; and/or control the second transmit antenna array 630 and the first receive antenna array 660 to receive and transmit a radar signal. Further, the communication signal and the radar signal occupy different frequency bands.

For another example, the processor 610 is configured to control the second transmit antenna array 630 and the second receive antenna array 640 to receive and transmit a communication signal; and/or control the first transmit antenna array 650 and the second receive antenna array 640 to receive and transmit a radar signal. Further, the communication signal and the radar signal occupy different frequency bands.

Optionally, the processor 610 may be the processor 410 in FIG. 15 or the processor 510 in FIG. 16. This is not limited in embodiments of this application.

Optionally, the apparatus 600 may further include a memory 670, and the memory 670 may be the memory 430 in FIG. 15 or the memory in FIG. 16. This is not limited in embodiments of this application.

An embodiment of this application further provides a computer storage medium. The computer storage medium stores computer instructions. When the computer instructions are run on an electronic device, the electronic device is enabled to perform the related method steps, to implement the communication method in the foregoing embodiments.

An embodiment of this application further provides a computer program product. When the computer program product runs on a computer, the computer is enabled to perform the foregoing related method steps, to implement the communication method in the foregoing embodiments.

The signal processing apparatus, the communication apparatus, the computer storage medium, the computer program product, or the chip provided in embodiments of this application are all configured to perform the corresponding method provided above. Therefore, for beneficial effects that can be achieved by the signal processing apparatus, the communication apparatus, the computer storage medium, the computer program product, or the chip, refer to beneficial effects in the corresponding method provided above. Details are not described herein again.

It should be understood that, in various embodiments of this application, sequence numbers of the foregoing processes do not mean execution sequences. The execution sequences of the processes should be determined according to functions and internal logic of the processes, and do not constitute any limitation on implementation processes of embodiments of this application.

A person of ordinary skill in the art may be aware that, in combination with examples described in embodiments disclosed in this specification, units and algorithm steps may be implemented by electronic hardware or a combination of computer software and electronic hardware. Whether the functions are performed by hardware or software depends on particular applications and design constraints of the technical solution. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are only examples. For example, division of the units is only logical function division, and may be other division during actual implementation. For example, a plurality of units or components may be combined or may be integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in embodiments.

In addition, functional units in embodiments of this application may be integrated into one processing unit, each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or a part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, like a USB flash drive, a removable hard disk, a ROM, a RAM, a magnetic disk, or an optical disc.

The foregoing descriptions are only specific implementations of this application, but are not intended to limit the protection scope of this application. Any variation or replacement readily figured out by a person skilled in the art in the technical scope disclosed in this application shall fall in the protection scope of this application. Therefore, the protection scope of this application should be subject to the protection scope of the claims.

What is claimed is:

1. A method, comprising:

transmitting a first radar signal in a first frequency band by using a first transmit antenna array;

receiving a first echo signal of the first radar signal in the first frequency band by using a first receive antenna array, wherein the first echo signal comprises an echo signal corresponding to at least one first terminal; and communicating with at least one second terminal in a second frequency band based on the first echo signal by using a second transmit antenna array and a second receive antenna array, wherein the at least one first terminal comprises the at least one second terminal, and the first frequency band and the second frequency band do not overlap, wherein the at least one second terminal comprises one or more of the at least one first terminal that satisfies the following condition: a first distance between the one or more of the at least one first terminal and the first receive antenna array is less than or equal to a first distance threshold in the at least one first terminal, wherein the second frequency band comprises a first sub-frequency band and a second sub-frequency band, the first sub-frequency band and the second sub-frequency band do not overlap, and the communicating with at least one second terminal in a second frequency band by using a second transmit antenna array and a second receive antenna array comprises at least one of:

receiving a first communication signal from the at least one second terminal in the first sub-frequency band by using the second receive antenna array; or transmitting a second communication signal to the at least one second terminal in the second sub-frequency band by using the second transmit antenna array, wherein: the second communication signal is transmitted after beamforming is performed, by using first angle information, on a signal transmitted by the second transmit antenna array; and the first angle information is obtained based on the first communication signal that indicates vehicle model information and is generated by the at least one second terminal.

2. The method according to claim 1, wherein a speed direction of the one or more of the at least one first terminal is a first direction in the at least one first terminal, and at least one of the first distance between the at least one first terminal and the first receive antenna array or the speed direction is obtained based on the first echo signal.

3. The method according to claim 2, wherein:

the first distance is indicated by using first distance information, and the speed direction is indicated by using speed information.

4. The method according to claim 1, wherein the transmitting a second communication signal to the at least one second terminal in the second sub-frequency band by using the second transmit antenna array comprises:

transmitting the second communication signal to the at least one second terminal in the second sub-frequency band based on the first communication signal by using the second transmit antenna array.

5. The method according to claim 1, wherein:

the first angle information indicates at least one of a horizontal angle or a pitch angle of the at least one second terminal relative to the second transmit antenna array.

6. The method according to claim 4, wherein the first echo signal comprises a second echo signal, and the second echo signal comprises an echo signal corresponding to the at least one second terminal; and wherein:

the transmitting the second communication signal to the at least one second terminal in the second sub-frequency band based on the first communication signal by using the second transmit antenna array comprises:

transmitting the second communication signal to at least one third terminal in the second sub-frequency band based on the first communication signal and the second echo signal by using the second transmit antenna array, wherein the at least one second terminal comprises the at least one third terminal.

7. The method according to claim 4, wherein the method further comprises:

transmitting a second radar signal in the first frequency band by using the first transmit antenna array; and receiving a second echo signal of the second radar signal in the first frequency band by using the first receive antenna array, wherein the second echo signal comprises an echo signal corresponding to the at least one second terminal; and wherein:

the transmitting the second communication signal to the at least one second terminal in the second sub-frequency band based on the first communication signal by using the second transmit antenna array comprises:

transmitting the second communication signal to at least one third terminal in the second sub-frequency band based on the first communication signal and the second echo signal by using the second transmit antenna array, wherein the at least one second terminal comprises the at least one third terminal.

8. The method according to claim 6, wherein:

the second communication signal is transmitted after beamforming is performed, by using second angle information and third angle information, on a signal transmitted by the second transmit antenna array, and wherein:

the second angle information indicates a pitch angle of the at least one third terminal relative to the second transmit antenna array, the third angle information indicates a horizontal angle of the at least one third terminal relative to the first transmit antenna array, the second angle information is obtained based on the first communication signal, and the third angle information is obtained based on the second echo signal.

9. The method according to claim 6, wherein:

the at least one third terminal comprises one or more of the at least one second terminal whose distance difference is less than or equal to a second distance threshold, wherein the distance difference indicates a difference between a second distance between the at least one second terminal and the first receive antenna array and a third distance between the at least one second terminal and the second receive antenna array, and wherein:

the second distance between the at least one second terminal and the first receive antenna array is obtained based on the second echo signal, and the third distance between the at least one second terminal and the second receive antenna array is determined based on the first communication signal.

10. The method according to claim 9, wherein the second distance is indicated by using second distance information, and the third distance is indicated by using third distance information.

11. The method according to claim 1, wherein the transmitting a second communication signal to the at least one second terminal in the second sub-frequency band by using the second transmit antenna array comprises:

transmitting the second communication signal to the at least one second terminal in the second sub-frequency band based on the first echo signal by using the second transmit antenna array.

12. The method according to claim 1, wherein:

the second communication signal is transmitted after beamforming is performed, by using fourth angle information, on a signal transmitted by the second transmit antenna array, and wherein:

the fourth angle information is obtained based on the first echo signal, and the fourth angle information indicates at least one of a horizontal angle or a pitch angle of the at least one second terminal relative to the second transmit antenna array.

13. The method according to claim 1, wherein the at least one second terminal comprises at least two terminals that belong to different lanes.

14. The method according to claim 1, wherein the first transmit antenna array is the second transmit antenna array, and the first receive antenna array is the second receive antenna array.

15. The method according to claim 14, wherein the second transmit antenna array comprises a plurality of transmit antennas, and the first radar signal is transmitted by using at least two transmit antennas of the plurality of transmit antennas.

16. The method according to claim 14, wherein the second receive antenna array comprises a plurality of receive antennas, and the first echo signal is received by using at least two receive antennas of the plurality of receive antennas.

17. The method according to claim 5, wherein:

the horizontal angle is obtained by performing first-dimensional fast Fourier transform (FFT) on a demodulated signal of the first communication signal; and the pitch angle is obtained by performing second-dimensional FFT on the demodulated signal of the first communication signal.

18. An apparatus, comprising:

at least one processor; and one or more memories coupled to the at least one processor and storing programming instructions for execution by the at least one processor to:

transmit a first radar signal in a first frequency band by using a first transmit antenna array;

receive a first echo signal of the first radar signal in the first frequency band by using a first receive antenna array, wherein the first echo signal comprises an echo signal corresponding to at least one first terminal; and communicate with at least one second terminal in a second frequency band based on the first echo signal by using a second transmit antenna array and a second receive antenna array, wherein the at least one first terminal comprises the at least one second terminal, and the first frequency band and the second frequency band do not overlap, wherein the at least one second terminal comprises one or more of the at least one first terminal that satisfies the following condition: a first distance between the one or more of the at least one first terminal and the first receive antenna array is less than or equal to a first distance threshold in the at least one first terminal, wherein the second frequency band comprises a first sub-frequency band and a second sub-frequency band, the first sub-frequency band and the second sub-frequency band do not overlap, and the communicating with at least one second terminal in a second frequency band by using a second transmit antenna array and a second receive antenna array comprises at least one of:

receiving a first communication signal from the at least one second terminal in the first sub-frequency band by using the second receive antenna array; or transmitting a second communication signal to the at least one second terminal in the second sub-frequency band by using the second transmit antenna array, wherein: the second communication signal is transmitted after beamforming is performed, by using first angle information, on a signal transmitted by the second transmit antenna array; and the first angle information is obtained based on the first communication signal that indicates vehicle model information and is generated by the at least one second terminal.

19. The apparatus according to claim 18, wherein a speed direction of the one or more of the at least one first terminal is a first direction in the at least one first terminal, and at least one of the first distance between the at least one first terminal and the first receive antenna array or the speed direction is obtained based on the first echo signal.

20. The apparatus according to claim 19, wherein:

the first distance is indicated by using first distance information, and the speed direction is indicated by using speed information.

* * * * *